(12) United States Patent
Ramachandran et al.

(10) Patent No.: US 8,517,261 B2
(45) Date of Patent: *Aug. 27, 2013

(54) AUTOMATED BANKING MACHINE THAT OUTPUTS INTERFERENCE SIGNALS THAT JAM READING ABILITY OF UNAUTHORIZED CARD READERS

(71) Applicant: Diebold Self-Service Systems division of Diebold, Incorporated, North Canton, OH (US)

(72) Inventors: Natarajan Ramachandran, Uniontown, OH (US); Jeffery M. Enright, Akron, OH (US); Dale H. Blackson, Canton, OH (US); Edward L. Laskowski, Seven Hills, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,620

(22) Filed: Nov. 2, 2012

(65) Prior Publication Data

US 2013/0056534 A1    Mar. 7, 2013

Related U.S. Application Data

(63) Continuation of application No. 13/479,713, filed on May 24, 2012, now Pat. No. 8,317,092, which is a continuation of application No. 13/200,697, filed on Sep. 28, 2011, now Pat. No. 8,186,579, which is a continuation of application No. 12/661,499, filed on Mar. 18, 2010, now Pat. No. 8,028,899, which is a continuation of application No. 11/542,644, filed on Oct. 3, 2006, now Pat. No. 7,798,395, which is a continuation-in-part of application No. 10/832,960, filed on Apr. 27, 2004, now Pat. No. 7,118,031, which is a continuation-in-part of application No. 10/601,813, filed on Jun. 23, 2003, now Pat. No. 7,240,827.

(60) Provisional application No. 60/429,478, filed on Nov. 26, 2002, provisional application No. 60/560,674, filed on Apr. 7, 2004, provisional application No. 60/815,287, filed on Jun. 20, 2006.

(51) Int. Cl.
*G06K 5/00* (2006.01)

(52) U.S. Cl.
USPC .......................................... 235/379; 235/380

(58) Field of Classification Search
USPC ........................................ 235/379, 380, 382
See application file for complete search history.

(56) References Cited

U.S. PATENT DOCUMENTS

| | | | | |
|---|---|---|---|---|
| 4,743,747 A | * | 5/1988 | Fougere et al. | 235/494 |
| 5,327,144 A | * | 7/1994 | Stilp et al. | 342/387 |

(Continued)

*Primary Examiner* — Daniel St. Cyr
(74) *Attorney, Agent, or Firm* — Ralph E. Jocke; Daniel D. Wasil; Walker & Jocke

(57) ABSTRACT

A cash dispensing automated banking machine includes a card reader associated with a card slot. An anti-fraud sensing device is able to sense ambient light or generated radiation that passes to the sensing device through the card reader slot. The installation of an unauthorized card reading device on the machine changes at least one property sensed by the sensing device. A controller in the machine receives signals from the sensing device, and determines if an unauthorized card reading device has been installed.

20 Claims, 14 Drawing Sheets

(56) References Cited

U.S. PATENT DOCUMENTS

| | | | |
|---|---|---|---|
| 5,790,429 A * | 8/1998 | Baker et al. | 700/304 |
| 5,883,810 A * | 3/1999 | Franklin et al. | 700/232 |
| 6,612,488 B2 * | 9/2003 | Suzuki | 235/380 |
| 7,992,777 B1 * | 8/2011 | Block et al. | 235/379 |
| 8,186,578 B1 * | 5/2012 | Block et al. | 235/379 |
| 2002/0078360 A1 * | 6/2002 | Black | 713/176 |

* cited by examiner

AUTOMATED BANKING MACHINE THAT OUTPUTS INTERFERENCE SIGNALS THAT JAM READING ABILITY OF UNAUTHORIZED CARD READERS

CROSS REFERENCE TO RELATED APPLICATIONS

This application is a continuation of U.S. application Ser. No. 13/479,713 filed May 24, 2012, which is a continuation of U.S. application Ser. No. 13/200,697 filed Sep. 28, 2011, now U.S. Pat. No. 8,186,579, which is a continuation of U.S. application Ser. No. 12/661,499 filed Mar. 18, 2010, now U.S. Pat. No. 8,028,899, which is a continuation of U.S. application Ser. No. 11/542,644 filed Oct. 3, 2006, now U.S. Pat. No. 7,798,395, which claims benefit pursuant to 35 U.S.C. §119 (e) of Provisional Application 60/815,287 filed Jun. 20, 2006. Application Ser. No. 11/542,644 is also a continuation-in-part of U.S. application Ser. No. 10/832,960 filed Apr. 27, 2004, now U.S. Pat. No. 7,118,031, which claims benefit pursuant to 35 U.S.C. §119(e) of Provisional Application 60/560,674 filed Apr. 7, 2004. Application Ser. No. 10/832, 960 is also a continuation-in-part of U.S. application Ser. No. 10/601,813 filed Jun. 23, 2003, now U.S. Pat. No. 7,240,827, which claims benefit under 35 U.S.C. §119(e) of Provisional Application 60/429,478 filed Nov. 26, 2002. The disclosure of each of these Applications is herein incorporated by reference.

TECHNICAL FIELD

This invention relates to automated banking machines that operate responsive to data read from data bearing records. Specifically this invention relates to automated banking machine apparatus, systems and methods that provide for improved security, reliability and serviceability.

BACKGROUND OF INVENTION

Automated banking machines are known. A common type of automated banking machine used by consumers is an automated teller machine ("ATM"). ATMs enable customers to carry out banking transactions. Examples of banking transactions that are sometimes carried out with ATMs include the dispensing of cash, the making of deposits, the transfer of funds between accounts, the payment of bills, the cashing of checks, the purchase of money orders, the purchase of stamps, the purchase of tickets, the purchase of phone cards and account balance inquiries. The types of banking transactions a customer can carry out at an ATM are determined by the particular banking machine, the system in which it is connected and the programming of the machine by the entity responsible for its operation.

Other types of automated banking machines may be operated in other types of environments. For example certain types of automated banking machines may be used in a customer service environment. For example service providers may use certain types of automated banking machines for purposes of counting currency or other items that are received from or which are to be given to a customer. Other types of automated banking machines may be used to validate items which provide the customer with access, value or privileges such as tickets, vouchers, checks or other financial instruments. Other examples of automated banking machines may include machines which are operative to provide users with the right to merchandise or services in an attended or a self-service environment. For purposes of this disclosure an automated banking machine shall be deemed to include any machine may be operated to carry out transactions including transfers of value.

Automated banking machines are typically used in environments where they carry out or support the conduct of transactions. It is desirable to keep automated banking machines in operation at all appropriate times to the extent possible. If a machine should experience a fraud attempt, it is useful to detect such attempt and return the machine to service as quickly as possible. Thus, there exists a need for improvements in the operation, reliability, servicing and repair of automated banking machines.

DISCLOSURE OF INVENTION

It is an object of an exemplary embodiment to provide an automated banking machine.

It is a further object of an exemplary embodiment to provide an automated banking machine which provides for reliable illumination of transaction areas while facilitating servicing of the machine.

It is a further object of an exemplary embodiment to provide an automated banking machine that facilitates the detection of fraudulent activity which may be attempted at the machine.

It is a further object of an exemplary embodiment to provide an automated banking machine which improved capabilities.

It is a further object of an exemplary embodiment to provide an automated banking machine which reduces the risk of unauthorized access to devices and operations of the machine.

Further objects of exemplary embodiments will be made apparent in the following Best Modes for Carrying Out Invention and the appended claims.

The foregoing objects are accomplished in some exemplary embodiments by an automated banking machine which is an ATM. The ATM includes a plurality of transaction function devices. In the exemplary embodiment the transaction function devices include input and output devices which are part of a user interface. In the exemplary embodiment the transaction function devices also include devices for carrying out types of banking transactions such as a currency dispenser device and a deposit accepting device. The exemplary ATM also includes at least one computer which is generally referred to herein as a controller, and which is operative to cause the operation of the transaction function devices in the machine.

In an exemplary embodiment the ATM includes a housing with a secure chest portion and an upper housing area. The chest portion houses certain transaction function devices such as the currency dispenser device. The chest portion includes a chest door which is generally secured but which is capable of being opened when unlocked by authorized persons.

In the exemplary embodiment the upper housing area includes a first portion and a second portion. Access to the first and second portions are controlled by independently movable first and second fascia portions. In the exemplary embodiment one or more devices that must be manipulated in order to unlock the chest door are positioned within the first housing area. Access to the first portion of the upper housing is controlled by a fascia lock in operative connection with the first fascia portion.

In some exemplary embodiments during operation of the ATM, the transaction areas are illuminated to facilitate operation of the machine by users. In an exemplary embodiment the controller of the ATM is operative to illuminate the transaction areas at those times when the user would be expected to receive or place items in such transaction areas during the conduct of transactions. This facilitates guiding the user to the particular transaction area on the machine even when the machine is being operated during daylight hours.

In some exemplary embodiments the capability of illuminating selected areas of the machine during certain transaction steps may be utilized in conjunction with anti-fraud devices. In an exemplary embodiment anti-fraud devices are used to reduce the risk that an unauthorized card reading device is installed externally of the machine adjacent to the card reader slot of the machine fascia. Criminals are sometimes ingenious and in the past some have produced reading devices that can intercept magnetic stripe data on cards that are being input to an ATM by a consumer. By intercepting this data, criminals may be able to conduct unauthorized transactions with the consumer's card number. Such external reading devices may be made to appear to be a part of the normal ATM fascia.

In an exemplary embodiment the housing in surrounding relation of the card reader slot is illuminated responsive to operation of the controller. In some exemplary machines the housing is operative to illuminate an area generally entirely surrounding the slot so as to make it more readily apparent to a user that an unauthorized modification or attachment to the fascia may have been made.

In some exemplary embodiments during normal operation, the illumination of the area surrounding the fascia card slot is operative to help to guide the user to the slot during transactions when a user is required to input or take their card. The exemplary ATM is provided with radiation sensing devices positioned adjacent to the illumination devices that are operative to illuminate the area surrounding the card reader slot. The exemplary controller is programmed to sense changes in the magnitude of radiation sensed by the one or more radiation sensing devices. The installation of an unauthorized card reading device in proximity to the card reading slot generally produces a change in the magnitude of the radiation sensed by the radiation sensing devices. The exemplary controller is programmed to recognize such changes and to take appropriate action in response thereto so as to reduce the possibility of fraud. Such action may include in some exemplary embodiments, the machine sending a status message through a network to a person to be notified of a possible fraud condition. Such actions may also include in some embodiments, warning the user of the machine to look for the installation of a possible fraud device. Of course these approaches are exemplary and in other embodiments other approaches may be used.

In some exemplary embodiments sensing devices may be provided in proximity to the keypad used by the customer to provide inputs, such as a personal identification number (PIN). Such sensors may be of the radiation sensing type or other type. Such sensors are adapted to sense the installation of unauthorized input intercepting devices above or adjacent to the keypad. The sensing of such an unauthorized device may cause an exemplary controller in the machine to give notice of the potential fraud device and/or to cease or modify the operation of the machine to reduce the risk of interception of customer inputs. In some exemplary embodiments radiation emitting devices used for sensing may provide outputs of visible light and may be used to guide a user at appropriate times during transactions to provide inputs to the keypad.

As will be appreciated, the foregoing objects and examples are exemplary and embodiments of the invention need not meet all or any of the foregoing objects, and need not include all or any of the exemplary features described above. Additional aspects and embodiments within the scope of the claims may be devised by those having skill in the art based on the teachings set forth herein.

BEST MODES FOR CARRYING OUT INVENTION

Figure 1:
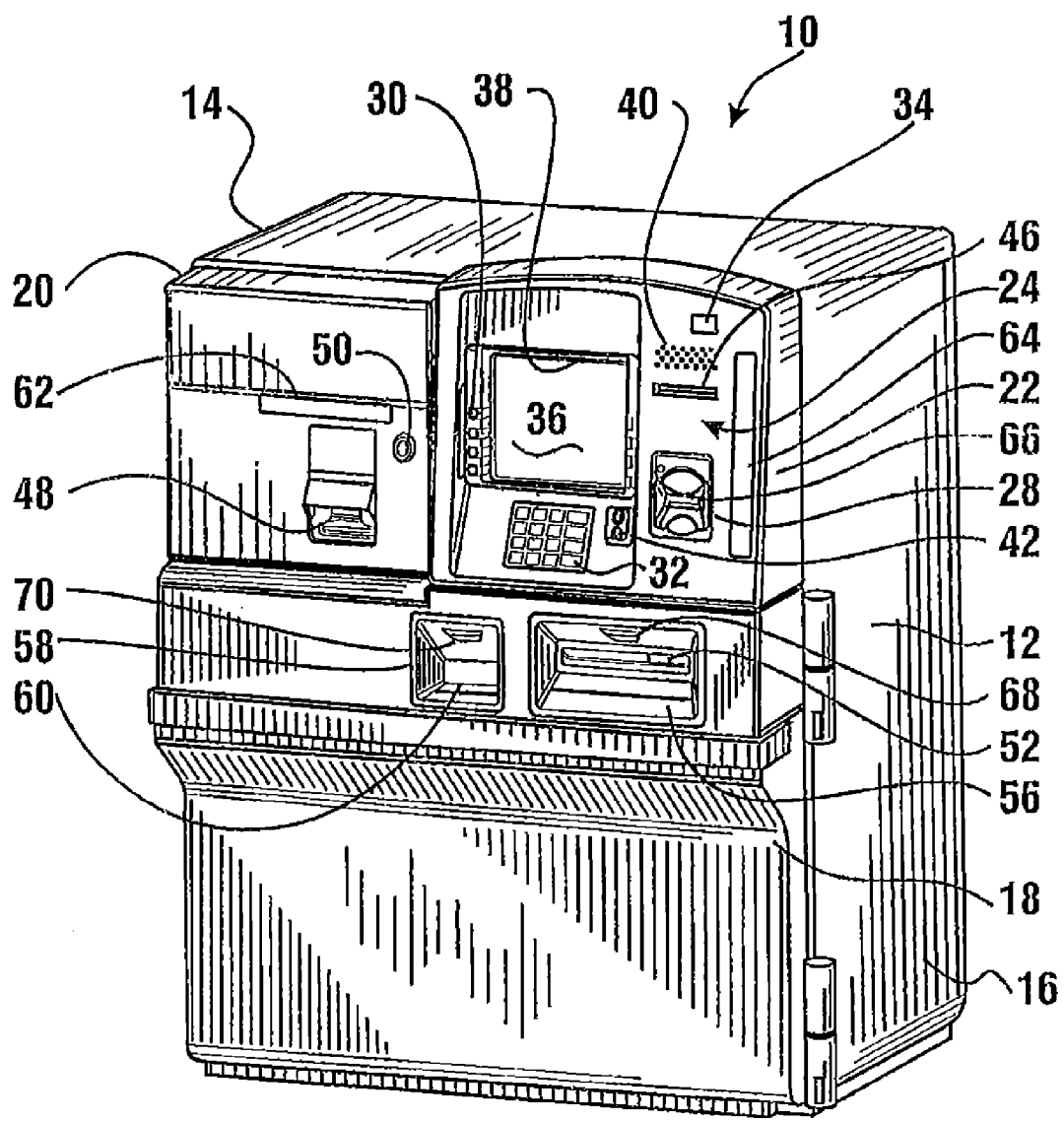
FIG. 1 is an isometric external view of an exemplary automated banking machine which is an ATM and which incorporates some aspects and features of embodiments described in the present application.

Referring now to the drawings and particularly to FIG. 1, there is shown therein an exemplary embodiment of an automated banking machine generally indicated 10. In the exemplary embodiment automated banking machine 10 is a drive up ATM, however the features described and claimed herein are not necessarily limited to ATMs of this type. The exemplary ATM includes a housing 12. Housing 12 includes an upper housing area 14 and a secure chest area 16 in a lower portion of the housing. Access to the chest area 16 is controlled by a chest door 18 which when unlocked by authorized persons in the manner later explained, enables gaining access to the interior of the chest area.

The exemplary ATM 10 further includes a first fascia portion 20 and a second fascia portion 22. Each of the fascia portions is movably mounted relative to the housing as later explained, which in the exemplary embodiment facilitates servicing.

The ATM includes a user interface generally indicated 24. The exemplary user interface includes input devices such as a card reader 26 (shown in FIG. 3) which is in connection with a card reader slot 28 which extends in the second fascia portion. Other input devices of the exemplary user interface 24 include function keys 30 and a keypad 32. The exemplary ATM 10 also includes a camera 34 which also may serve as an input device for biometric features and the like. The exemplary user interface 24 also includes output devices such as a display 36. Display 36 is viewable by an operator of the machine when the machine is in the operative condition through an opening 38 in the second fascia portion 22. Further output devices in the exemplary user interface include a speaker 40. A headphone jack 42 also serves as an output device. The headphone jack may be connected to a headphone provided by a user who is visually impaired to provide the user with voice guidance in the operation of the machine. The exemplary machine further includes a receipt printer 44 (see FIG. 3) which is operative to provide users of the machine with receipts for transactions conducted. Transaction receipts are provided to users through a receipt delivery slot 46 which extends through the second fascia portion. Exemplary receipt printers that may be used in some embodiments are shown in U.S. Pat. No. 5,729,379 and U.S. Pat. No. 5,850,075, the disclosures of which are incorporated by reference herein. It should be understood that these input and output devices of the user interface 24 are exemplary and in other embodiments, other or different input and output devices may be used.

In the exemplary embodiment the second fascia portion has included thereon a deposit envelope providing opening 48. Deposit envelopes may be provided from the deposit envelope providing opening to users who may place deposits in the machine. The second fascia portion 20 also includes a fascia lock 50. Fascia lock 50 is in operative connection with the second fascia portion and limits access to the portion of the interior of the upper housing behind the fascia to authorized persons. In the exemplary embodiment fascia lock 50 comprises a key type lock. However, in other embodiments other types of locking mechanisms may be used. Such other types of locking mechanisms may include for example, other types of mechanical and electronic locks that are opened in response to items, inputs, signals, conditions, actions or combinations or multiples thereof.

The exemplary ATM 10 further includes a delivery area 52. Delivery area 52 is in connection with a currency dispenser device 54 which is alternatively referred to herein as a cash dispenser, which is positioned in the chest portion and is shown schematically in FIG. 3. The delivery area 52 is a transaction area on the machine in which currency sheets are delivered to a user. In the exemplary embodiment the delivery area 52 is positioned and extends within a recessed pocket 56 in the housing of the machine.

ATM 10 further includes a deposit acceptance area 58. Deposit acceptance area is an area through which deposits such as deposit envelopes to be deposited by users are placed in the machine. The deposit acceptance area 58 is in operative connection with a deposit accepting device positioned in the chest area 16 of the ATM. Exemplary types of deposit accepting devices are shown in U.S. Pat. No. 4,884,769 and U.S. Pat. No. 4,597,330, the disclosures of which are incorporated herein by reference.

In the exemplary embodiment the deposit acceptance area serves as a transaction area of the machine and is positioned and extends within a recessed pocket 60. It should be understood that while the exemplary embodiment of ATM 10 includes an envelope deposit accepting device and a currency sheet dispenser device, other or different types of transaction function devices may be included in automated banking machines. These may include for example, check and/or money order accepting devices, ticket accepting devices, stamp accepting devices, card dispensing devices, money order dispensing devices and other types of devices which are operative to carry out transaction functions.

In the exemplary embodiment the ATM 10 includes certain illuminating devices which are used to illuminate transaction areas, some of which are later discussed in detail. First fascia portion 20 includes an illumination panel 62 for illuminating the deposit envelope providing opening. Second fascia portion 22 includes an illumination panel 64 for illuminating the area of the receipt delivery slot 46 and the card reader slot 28. Further, an illuminated housing 66 later discussed in detail, bounds the card reader slot 28. Also, in the exemplary embodiment an illuminating window 68 is positioned in the recessed pocket 56 of the delivery area 52. An illuminating window 70 is positioned in the recessed pocket 60 of the deposit acceptance area 58. It should be understood that these structures and features are exemplary and in other embodiments other structures and features may be used.

Figure 3:
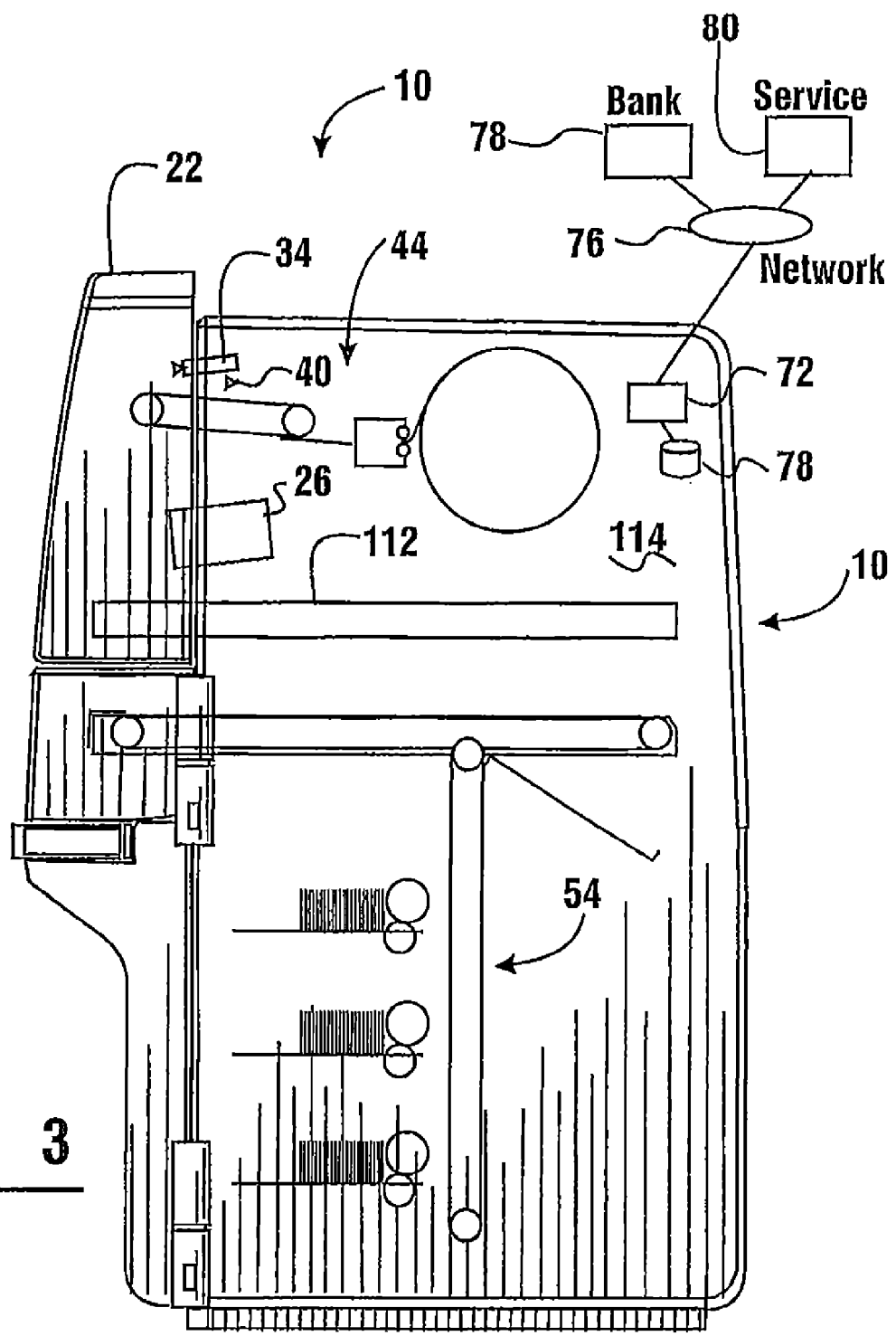
FIG. 3 is a transparent side view showing schematically some internal features of the ATM.

As schematically represented in FIG. 3, the ATM 10 includes one or more internal computers which are alternatively referred to herein as controllers. Such internal computers include one or more processors. Such processors may be in operative connection with one or more data stores. In some embodiments processors may be located on certain devices within the ATM so as to individually control the operation thereof. Examples such as multi-tiered processor systems are shown in U.S. Pat. No. 6,264,101 and U.S. Pat. No. 6,131,809, the disclosures of which are incorporated herein by reference.

For purposes of simplicity, the exemplary embodiment will be described as having a single controller which controls the operation of devices within the machine. However it should be understood that such reference shall be construed to encompass multicontroller and multiprocessor systems as may be appropriate in controlling the operation of a particular machine. In FIG. 3 the controller is schematically represented 72. Also as schematically represented, the controller is in operative connection with one or more data stores 78. Such data stores in exemplary embodiments are operative to store program instructions, values and other information used in the operation of the machine. Although the controller is schematically shown in the upper housing portion of ATM 10, it should be understood that in alternative embodiments controllers may be located within various portions of the automated banking machine.

In order to conduct transactions the exemplary ATM 10 communicates with remote computers. The remote computers are operative to exchange messages with the machine and authorize and record the occurrence of various transactions. This is represented in FIG. 3 by the communication of the machine through a network with a bank 78, which has at least one computer which is operative to exchange messages with the ATM through a network. For example, the bank 78 may receive one or more messages from the ATM requesting authorization to allow a customer to withdraw $200 from the customer's account. The remote computer at the bank 78 will operate to determine that such a withdrawal is authorized and will return one or more messages to the machine through the network authorizing the transaction. After the ATM conducts the transaction, the ATM will generally send one or more messages back through the network to the bank indicating that the transaction was successfully carried out. Of course these messages are merely exemplary.

It should be understood that in some embodiments the ATM may communicate with other entities and through various networks. For example as schematically represented in FIG. 3, the ATM will communicate with computers operated by service providers 80. Such service providers may be entities to be notified of status conditions or malfunctions of the ATM as well as entities who are to be notified of corrective actions. An example of such a system for accomplishing this is shown in U.S. Pat. No. 5,984,178, the disclosure of which is incorporated herein by reference. Other third parties who may receive notifications from exemplary ATMs include entities responsible for delivering currency to the machine to assure that the currency supplies are not depleted. Other entities may be responsible for removing deposit items from the machine. Alternative entities that may be notified of actions at the machine may include entities which hold marketing data concerning consumers and who provide messages which correspond to marketing messages to be presented to consumers. Various types of messages may be provided to remote systems and entities by the machine depending on the capabilities of the machines in various embodiments and the types of transactions being conducted.

Figure 4:
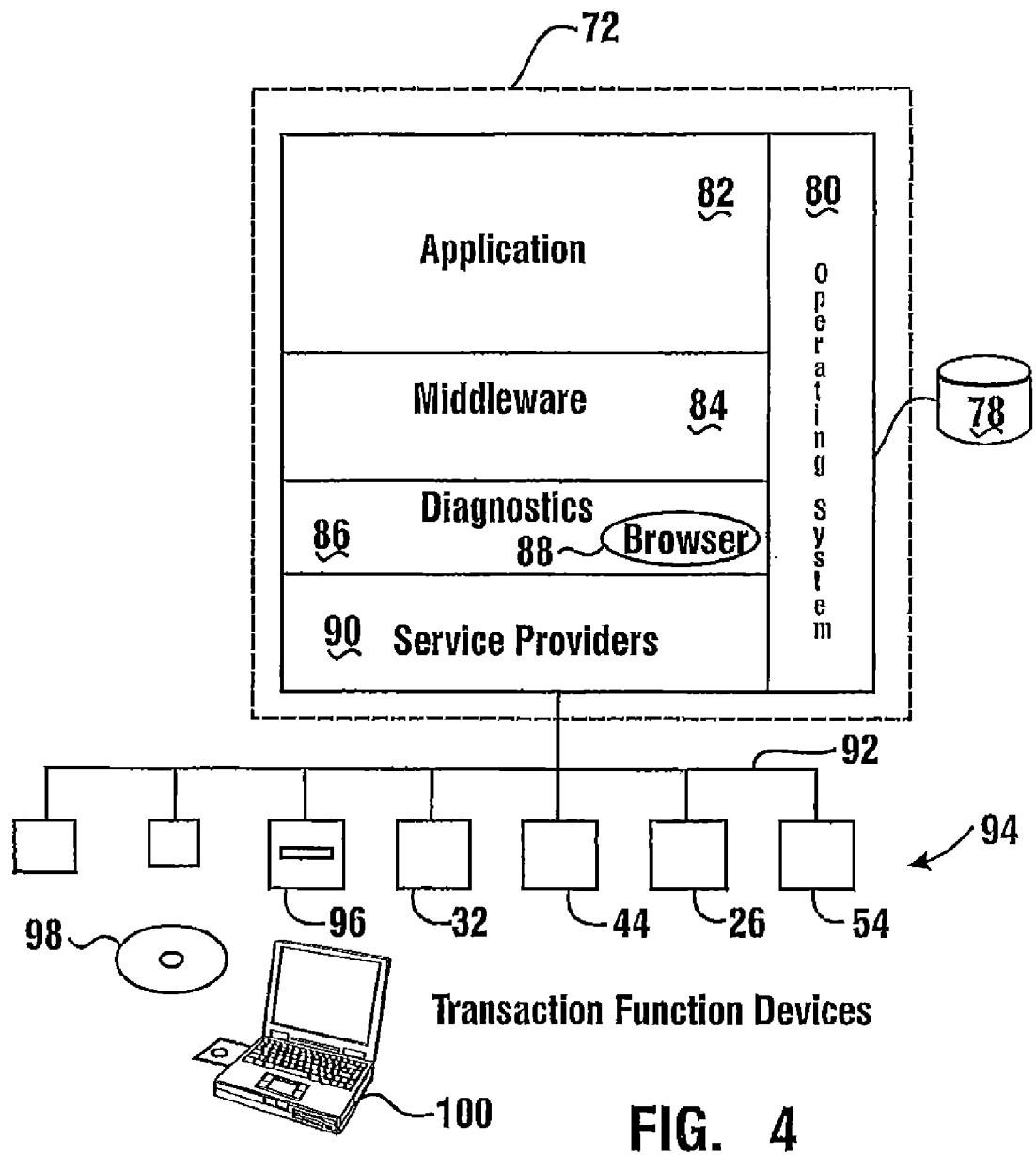
FIG. 4 is a schematic view representative of the software architecture of an exemplary embodiment.

FIG. 4 shows schematically an exemplary software architecture which may be operative in the controller 72 of machine 10. The exemplary software architecture includes an operating system such as for example Microsoft® Windows, IBM OS/2® or Linux. The exemplary software architecture also includes an ATM application 82. The exemplary application includes the instructions for the operation of the automated banking machine and may include, for example, an Agilis® 91x application that is commercially available from Diebold, Incorporated which is a cross vendor software application for operating ATMs. Further examples of software applications which may be used in some embodiments is shown in U.S. Pat. Nos. 6,289,320 and 6,505,177, the disclosures of which are incorporated herein by reference.

In the exemplary embodiment middleware software schematically indicated 84 is operative in the controller. In the exemplary embodiment the middleware software operates to compensate for differences between various types of automated banking machines and transaction function devices used therein. The use of a middleware layer enables the more ready use of an identical software application on various types of ATM hardware. In the exemplary embodiment the middleware layer may be Involve® software which is commercially available from Nexus Software, a wholly owned subsidiary of the assignee of the present invention.

The exemplary software architecture further includes a diagnostics layer 86. The diagnostics layer 86 is operative as later explained to enable accessing and performing various diagnostic functions of the devices within the ATM. In the exemplary embodiment the diagnostics operate in conjunction with a browser schematically indicated 88.

The exemplary software architecture further includes a service provider layer schematically indicated 90. The service provider layer may include software such as WOSA XFS service providers for J/XFS service providers which present a standardized interface to the software layers above and which facilitate the development of software which can be used in conjunction with different types of ATM hardware. Of course this software architecture is exemplary and in other embodiments other architectures may be used.

As schematically represented in FIG. 4, a controller 72 is in operative connection with at least one communications bus 92. The communications bus may in some exemplary embodiments be a universal serial bus (USB) or other standard or nonstandard type of bus architecture. The communications bus 92 is schematically shown in operative connection with transaction function devices 94. The transaction function devices include devices in the ATM which are used to carry out transactions. These may include for example the currency dispenser device 54, card reader 26, receipt printer 44, keypad 32, as well as numerous other devices which are operative in the machine and controlled by the controller to carry out transactions. In the exemplary embodiment one of the transaction function devices in operative connection with the controller is a diagnostic article reading device 96 which may be operative to read a diagnostic article schematically indicated 98 which may provide software instructions useful in servicing the machine. Alternatively and/or in addition, provision may be made for connecting the bus 92 or other devices in the machine computer device 100 which may be useful in performing testing or diagnostic activities related to the ATM.

Figure 5:
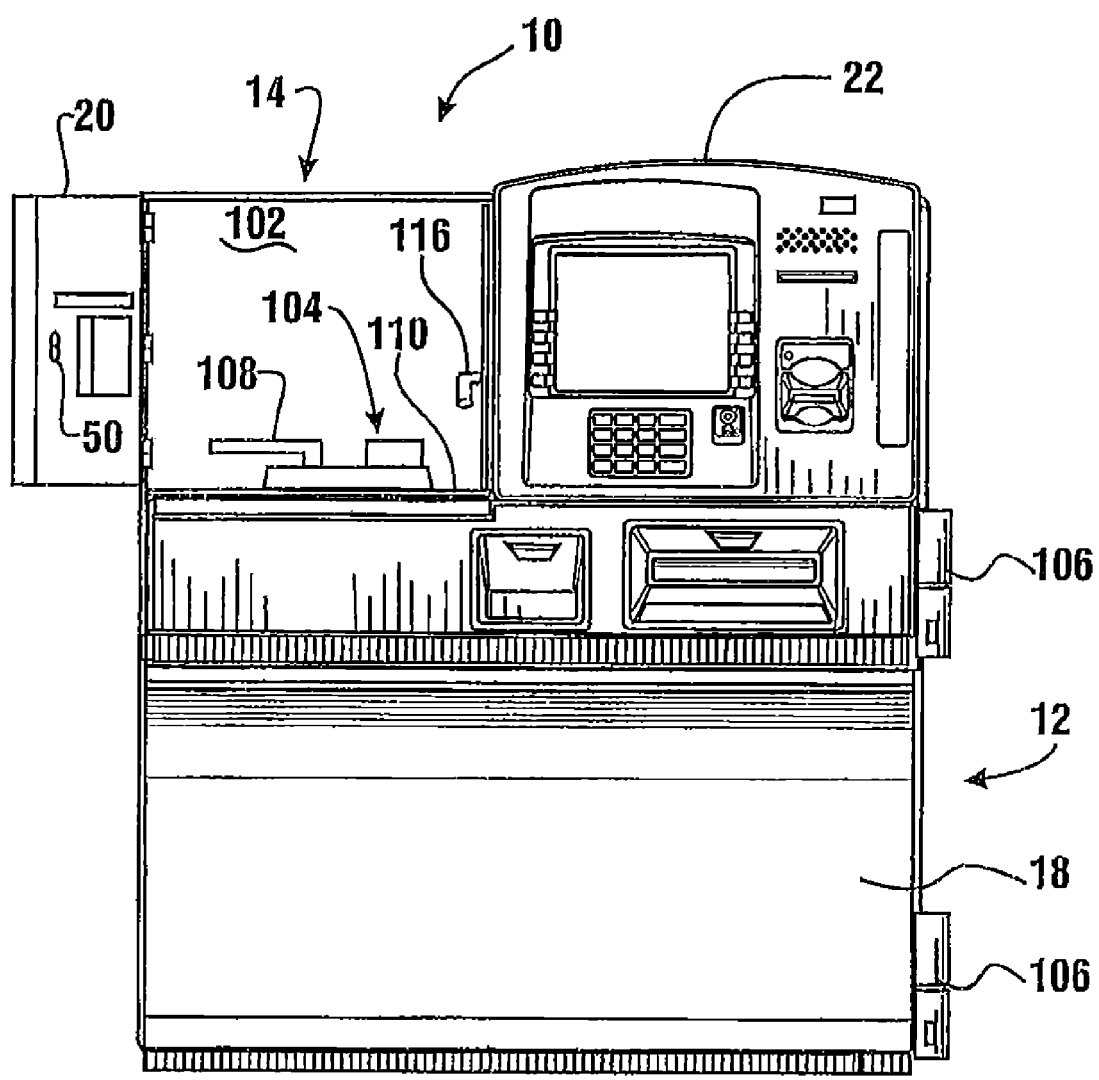
FIG. 5 is a front view showing the fascia portion moved to access a first portion of an upper housing of the machine.

In the exemplary embodiment of ATM 10 the first fascia portion 20 and the second fascia portion 22 are independently movably mounted on the ATM housing 12. This is accomplished through the use of hinges attached to fascia portion 20. The opening of the fascia lock 50 on the first fascia portion 20 enables the first fascia portion to be moved to an open position as shown in FIG. 5. In the open position of the first fascia portion an authorized user is enabled to gain access to a first portion 102 in the upper housing area 14. In the exemplary embodiment there is located within the first portion 102 a chest lock input device 104. In this embodiment the chest lock input device comprises a manual combination lock dial, electronic lock dial or other suitable input device through which a combination or other unlocking inputs or articles may be provided. In this embodiment, input of a proper combination enables the chest door 18 to be moved to an open position by rotating the door about hinges 106. In the exemplary embodiment the chest door is opened once the proper combination has been input by manipulating a locking lever 108 which is in operative connection with a boltwork. The boltwork which is not specifically shown, is operative to hold the chest door in a locked position until the proper combination is input. Upon input of the correct combination the locking lever enables movement of the boltwork so that the chest door can be opened. The boltwork also enables the chest door to be held locked after the activities in the chest portion have been conducted and the chest door is returned to the closed position. Of course in other embodiments other types of mechanical or electrical locking mechanisms may be used. In the exemplary embodiment the chest lock input device 104 is in supporting connection with a generally horizontally extending dividing wall 110 which separates the chest portion from the upper housing portion. Of course this housing structure is exemplary and in other embodiments other approaches may be used.

An authorized servicer who needs to gain access to an item, component or device of the ATM located in the chest area may do so by opening the fascia lock and moving the first fascia portion 20 so that the area 102 becomes accessible. Thereafter the authorized servicer may access and manipulate the chest lock input device to receive one or more inputs, which if appropriate enables unlocking of the chest door 18. The chest door may thereafter be moved relative to the housing and about its hinges 106 to enable the servicer to gain access to items, devices or components within the chest. These activities may include for example adding or removing currency, removing deposited items such as envelopes or checks, or repairing mechanisms or electrical devices that operate to enable the machine to accept deposited items or to dispense currency. When servicing activity within the chest is completed, the chest door may be closed and the locking lever 108 moved so as to secure the boltwork holding the chest door in a closed position. Of course this structure and service method is exemplary and in other embodiments other approaches may be used.

In the exemplary embodiment the second fascia portion 22 is also movable relative to the housing of the machine. In the exemplary embodiment the second fascia portion 22 is movable in supporting connection with a rollout tray 112 schematically shown in FIG. 3. The rollout tray is operative to support components of the user interface thereon as well as the second fascia portion. The rollout tray enables the second fascia portion to move outward relative to the ATM housing thereby exposing components and transaction function devices supported on the tray and providing access to a second portion 114 within the upper housing and positioned behind the second fascia portion. Thus as can be appreciated, when the second fascia portion is moved outward, the components on the tray are disposed outside the housing of the machine so as to facilitate servicing, adjustment and/or replacement of such components. Further components which remain positioned within the housing of the machine as the rollout tray is extended become accessible in the second portion as the second fascia portion 22 is disposed outward and away from the housing.

Figure 2:
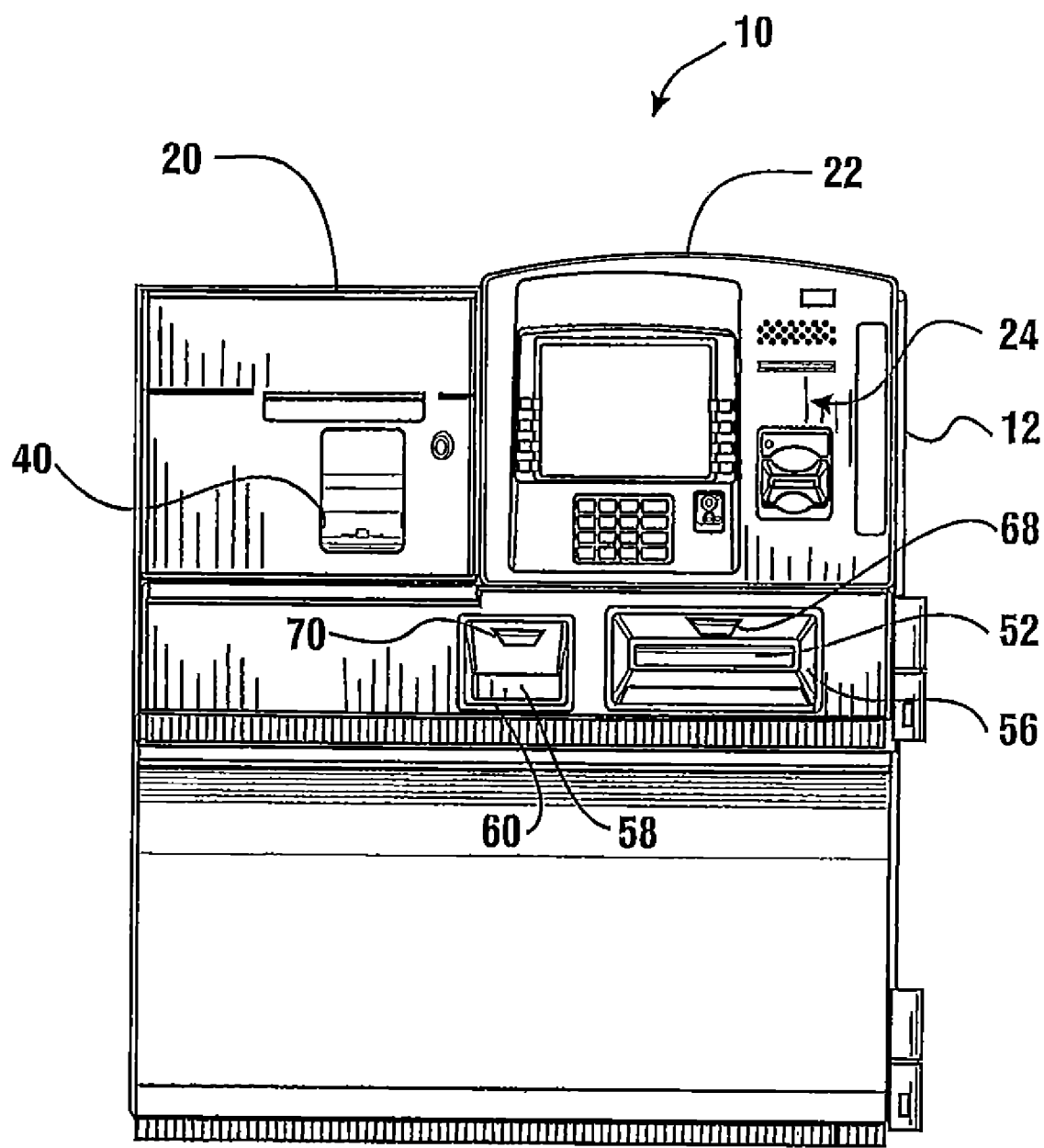
FIG. 2 is a front plan view of the ATM shown in FIG. 1.

In the exemplary embodiment the rollout tray 112 is in operative connection with a releasible locking device. The locking device is generally operative to hold the tray in a retracted position such that the second fascia portion remains in an operative position adjacent to the upper housing area as shown in FIGS. 1, 2 and 3. This releasible locking mechanism may comprise one or more forms of locking type devices. In the exemplary embodiment the releasible locking mechanism may be released by manipulation of an actuator 116 which is accessible to an authorized user in the first portion 102 of the upper housing 14. As a result an authorized servicer of the machine is enabled to move the second fascia portion outward for servicing by first accessing portion 102 in the manner previously discussed. Thereafter by manipulating the actuator 116 the second fascia portion is enabled to move outward as shown in phantom in FIG. 8 so as to facilitate servicing components on the rollout tray. Such components may include for example a printer or card reader. After such servicing the second fascia portion may be moved toward the housing so as to close the second portion 114. Such movement in the exemplary embodiment causes the rollout tray to be latched and held in the retracted position without further manipulation of the actuator. However, in other embodiments other types of locking mechanisms may be used to secure the rollout tray in the retracted position. It should be understood that this approach is exemplary and in other embodiments other approaches may be used.

Figure 6:
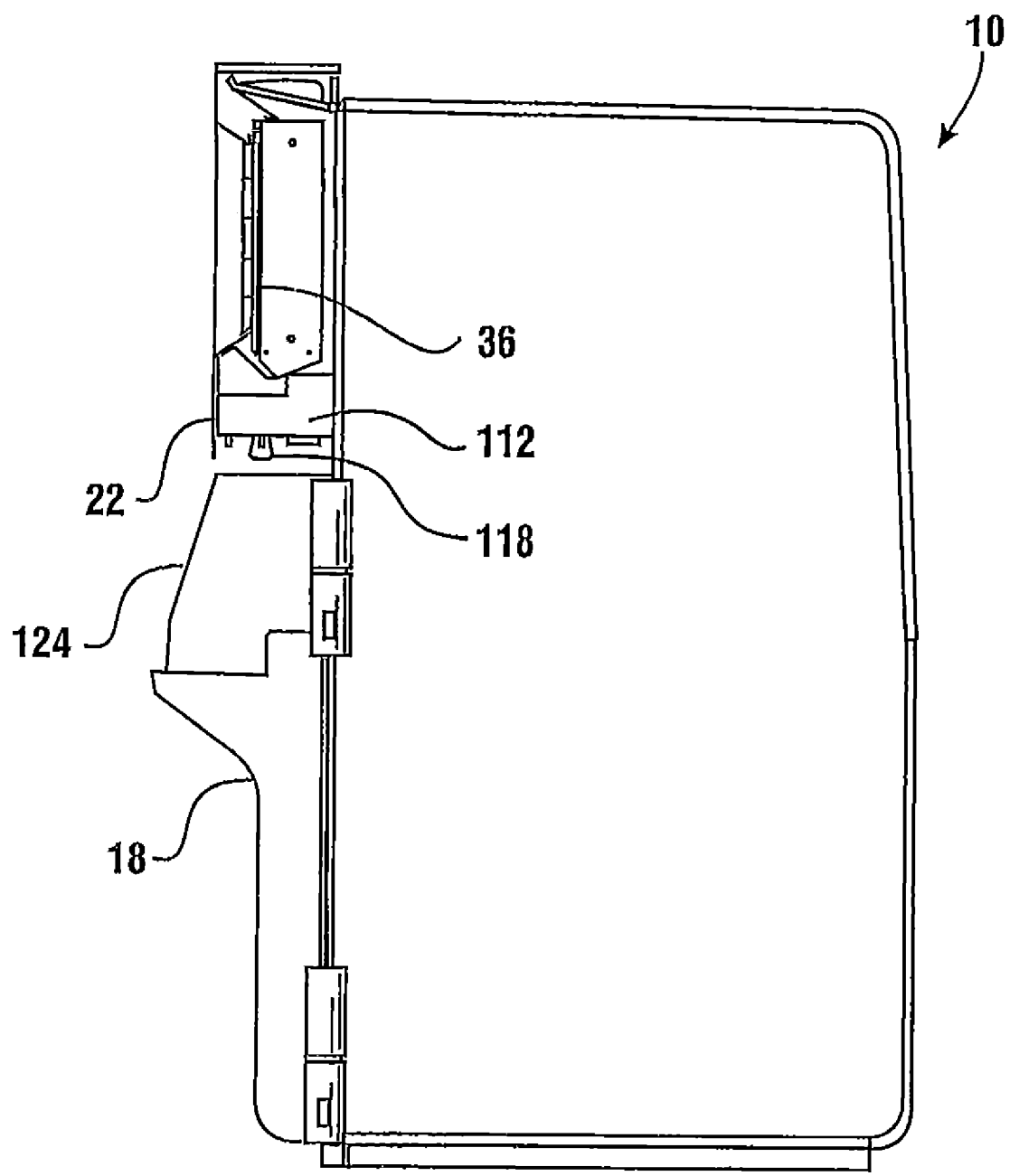
FIG. 6 is a partially transparent side view showing air flow through an air cooling opening of the machine.
Figure 7:
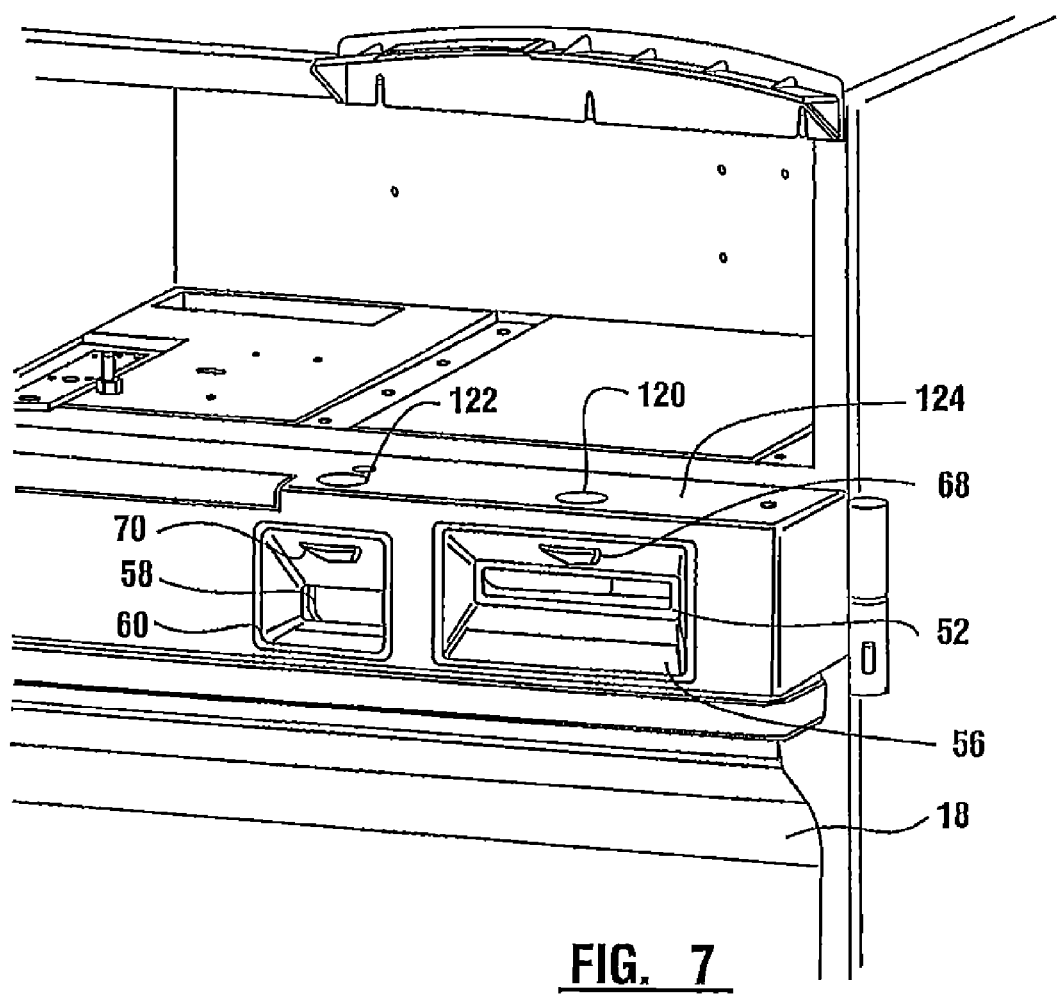
FIG. 7 is an isometric view of the ATM shown in FIG. 1 with the components of the upper housing portion removed.
Figure 10:
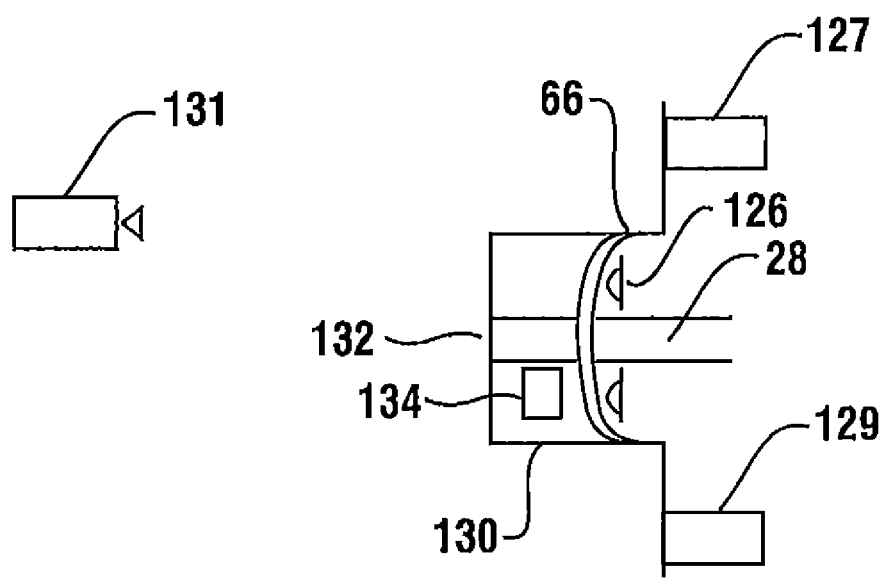
FIG. 10 is a schematic side view of an unauthorized card reading device in operative connection with a housing of the anti-fraud sensor.

As best shown in FIG. 7 in which the components supported in the upper housing are not shown, the delivery area 52 and the deposit acceptance area 58 are in supporting connection with the chest door 18. As such when the chest door 18 is opened, the delivery area 52 and the deposit acceptance area 58 will move relative to the housing of the machine. The exemplary embodiment shown facilitates servicing of the machine by providing for the illumination for the transaction areas by illumination sources positioned in supporting connection with the rollout tray 112. As best shown in FIG. 6, these illumination sources 118 are movable with the rollout tray and illuminate in generally a downward direction. In the operative position of the second fascia portion 22 and the chest door 18, the illumination sources are generally aligned with apertures 120 and 122 which extend through the top of a cover 124 which generally surrounds the recessed pockets 60 and 56. As shown in FIG. 10 aperture 120 is generally vertically aligned with window 68 and aperture 122 is generally aligned with window 70. In an exemplary embodiment apertures 120 and 122 each have a translucent or transparent lens positioned therein to minimize the risk of the introduction of dirt or other contaminants into the interior of the cover 124.

Figure 8:
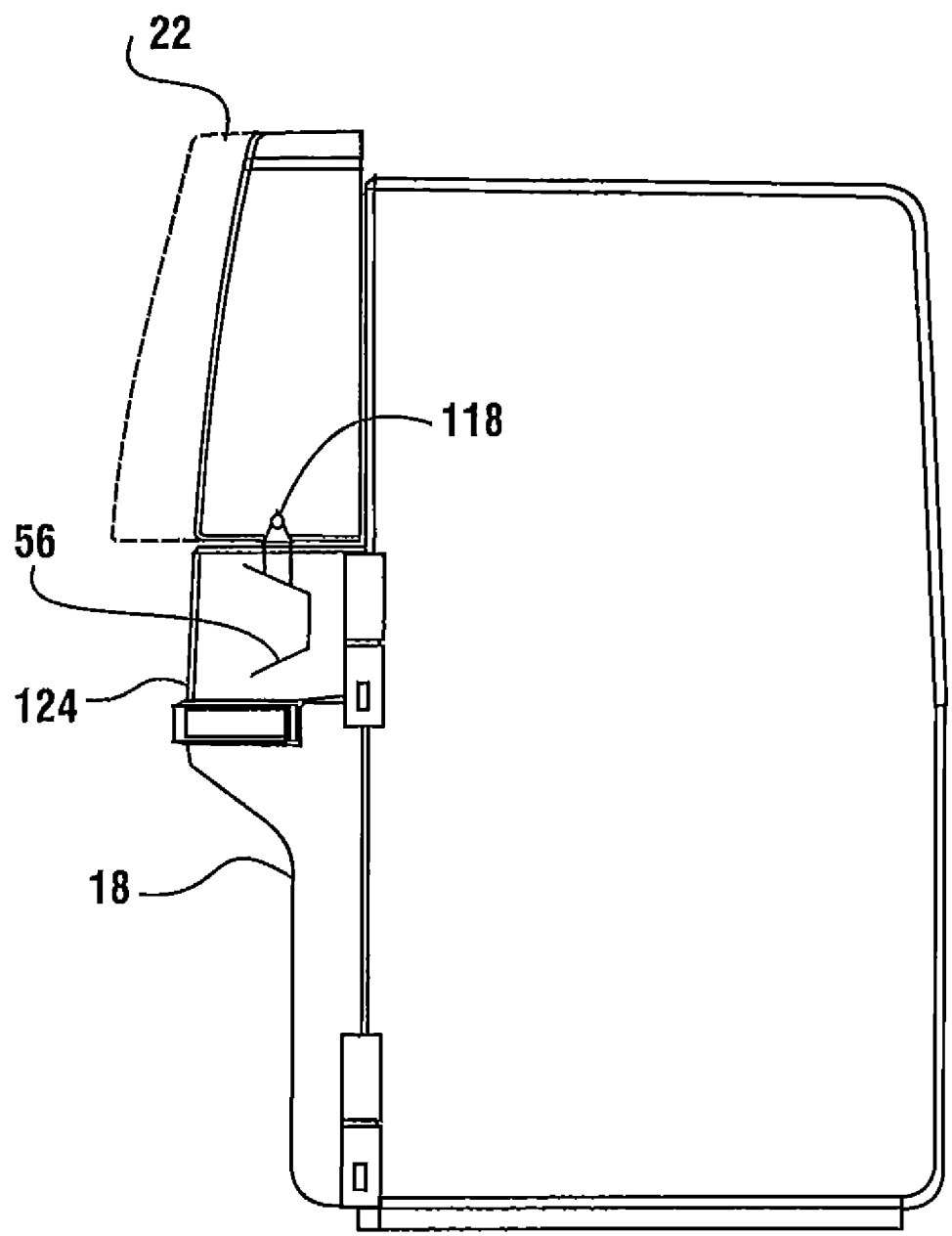
FIG. 8 is a schematic side view of the housing showing schematically the illumination system for the transaction areas and representing in phantom the movement of the upper fascia portion so as to provide access for servicing.

As can be appreciated from FIGS. 6 and 8, when the chest door 18 is closed and the second fascia portion 22 is moved to the operative position, the illumination sources 118 are positioned in generally aligned relation with apertures 120 and 122. As a result the illumination of the illumination devices is operative to cause light to be transmitted through the respective aperture and to illuminate the transaction area within the corresponding recessed pocket.

In operation of an exemplary embodiment, the controller executes programmed instructions so as to initiate illumination of each transaction area at appropriate times during the conduct of transactions. For example in the exemplary embodiment if the user is conducting a cash withdrawal transaction, the controller may initiate illumination of the delivery area 52 when the cash is delivered therein and is available to be taken by a user. Such illumination draws the user's attention to the need to remove the cash and will point out to the user that the cash is ready to be taken. In the exemplary embodiment the controller is programmed so that when the user takes the cash the machine will move to the next transaction step. After the cash is sensed as taken, the controller may operate to cease illumination of the delivery area 56. Of course these approaches are exemplary.

Likewise in an exemplary embodiment if a user of the machine indicates that they wish to conduct a deposit transaction, the controller may cause the machine to operate to initiate illumination of the deposit acceptance area 58. The user's attention is drawn to the place where they must insert the deposit envelope in order to have it be accepted in the machine. In the exemplary embodiment the controller may operate to also illuminate the illumination panel 62 to illuminate the deposit envelope providing opening 48 so that the user is also made aware of the location from which a deposit envelope may be provided. In an exemplary embodiment the controller may operate to cease illumination through the window 70 and/or the illumination panel 62 after the deposit envelope is indicated as being sensed within the machine.

In alternative embodiments other approaches may be taken. This may include for example drawing the customer's attention to the particular transaction area by changing the nature of the illumination in the recessed pocket to which the customer's attention is to be drawn. This may be done for example by changing the intensity of the light, flashing the light, changing the color of the light or doing other actions which may draw a user's attention to the appropriate transaction area. Alternatively or in addition, a sound emitter, vibration, projecting pins or other indicator may be provided for visually impaired users so as to indicate to them the appropriate transaction area to which the customer's attention is to be drawn. Of course these approaches are exemplary and in other embodiments other approaches may be used.

Figure 9:
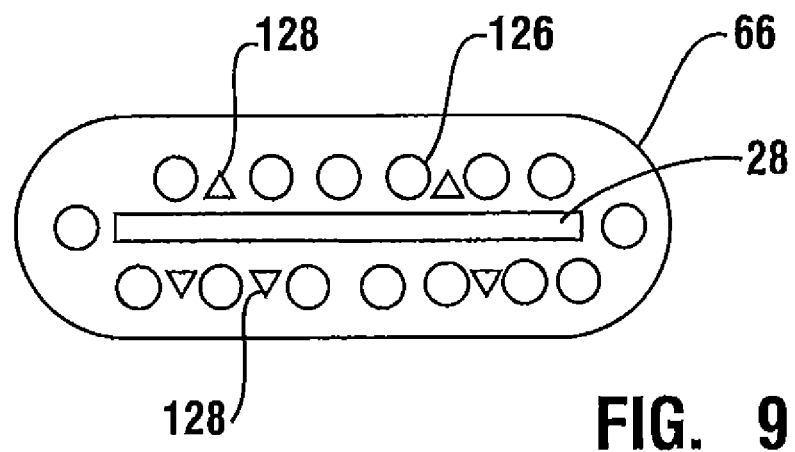
FIG. 9 is a schematic view of an illumination and anti-fraud sensing device which bounds a card reader slot of an exemplary embodiment.

As previously discussed the exemplary embodiment of ATM 10 is also operative to draw a user's attention at appropriate times to the card reader slot 28. ATM 10 also includes features to minimize the risk of unauthorized interception of card data by persons who may attempt to install a fraud device such as an unauthorized card reading device on the machine. As shown in FIG. 9, the exemplary card slot 28 extends through a card slot housing 66 which extends in generally surrounding relation of the card slot. It should be understood that although the housing 66 generally bounds the entire card slot, in other embodiments the principles described herein may be applied by bounding only one or more sides of a card slot as may be appropriate for detecting unauthorized card reading devices. Further, it should be understood that while the exemplary embodiment is described in connection with a card reader that accepts a card into the machine, the principles being described may be applied to types of card readers that do not accept a card into the machine, such as readers where a user draws the card through a slot, inserts and removes a card manually from a slot and other card reading structures.

In the exemplary embodiment the housing 66 includes a plurality of radiation emitting devices 126. The radiation emitting devices emit visible radiation which can be perceived by a user of the machine. However, in other embodiments the radiation emitting devices may include devices which emit nonvisible radiation such as infrared radiation, but which nonetheless can be used for sensing the presence of unauthorized card reading devices adjacent to the card slot. In the exemplary embodiment the controller operates to illuminate the radiation emitting devices 126 at appropriate times during the transaction sequence. This may include for example times during transactions when a user is prompted to input the card into the machine or alternatively when a user is prompted to take the card from the card slot 28. In various embodiments the controller may be programmed to provide solid illumination of the radiation emitting devices or may vary the intensity of the devices as appropriate to draw the user's attention to the card slot.

In the exemplary embodiment the card slot housing 66 includes therein one or more radiation sensing devices 128. The radiation sensing devices are positioned to detect changes in at least one property of the radiation reflected from the emitting devices 126. The sensing devices 128 are in operative connection with the controller. The controller is operative responsive to its programming to compare one or more values corresponding to the magnitude and/or other properties of radiation sensed by one or more of the sensors, to one or more stored values and to make a determination whether the comparison is such that there is a probable unauthorized card reading device installed on the fascia of the machine. In some embodiments the controller may be operative to execute fuzzy logic programming for purposes of determining whether the nature of the change in reflected radiation or other detected parameters are such that there has been an unauthorized device installed and whether appropriate personnel should be notified.

FIG. 10 shows a side view of the housing 66. An example of a fraud device which comprises unauthorized card reading device 130 is shown attached externally to the housing 66. The unauthorized card reading device includes a slot 132 generally aligned with slot 128. The device 130 also includes a sensor shown schematically as 134 which is operative to sense the encoded magnetic flux reversals which represent data on the magnetic stripe of a credit or debit card. As can be appreciated, an arrangement of the type shown in FIG. 10 enables the sensor 134 if properly aligned adjacent to the magnetic stripe of a card, to read the card data as the card passes in and out of slot 128. Such an unauthorized reading device may be connected via radio frequency (RF) or through inconspicuous wiring to other devices which enable interception of the card data. In some situations criminals may also endeavor to observe the input of the user's PIN corresponding to the card data so as to gain access to the account of the user.

As can be appreciated from FIG. 10 the installation of the unauthorized card reading device 130 changes the amount of radiation from emitting devices 126 and that is reflected or otherwise transmitted to the sensors 128. Depending on the nature of the device and its structure, the amount or other properties of radiation may increase or decrease. However, a detectable change will often occur in the magnitude or other properties of sensed radiation between a present transaction and a prior transaction which was conducted prior to an unauthorized card reading device being installed. Of course the sensing of the magnitude of radiation is but one example of a property of radiation that may be sensed as having changed so as to indicate the presence of an unauthorized reading device.

Figure 11:
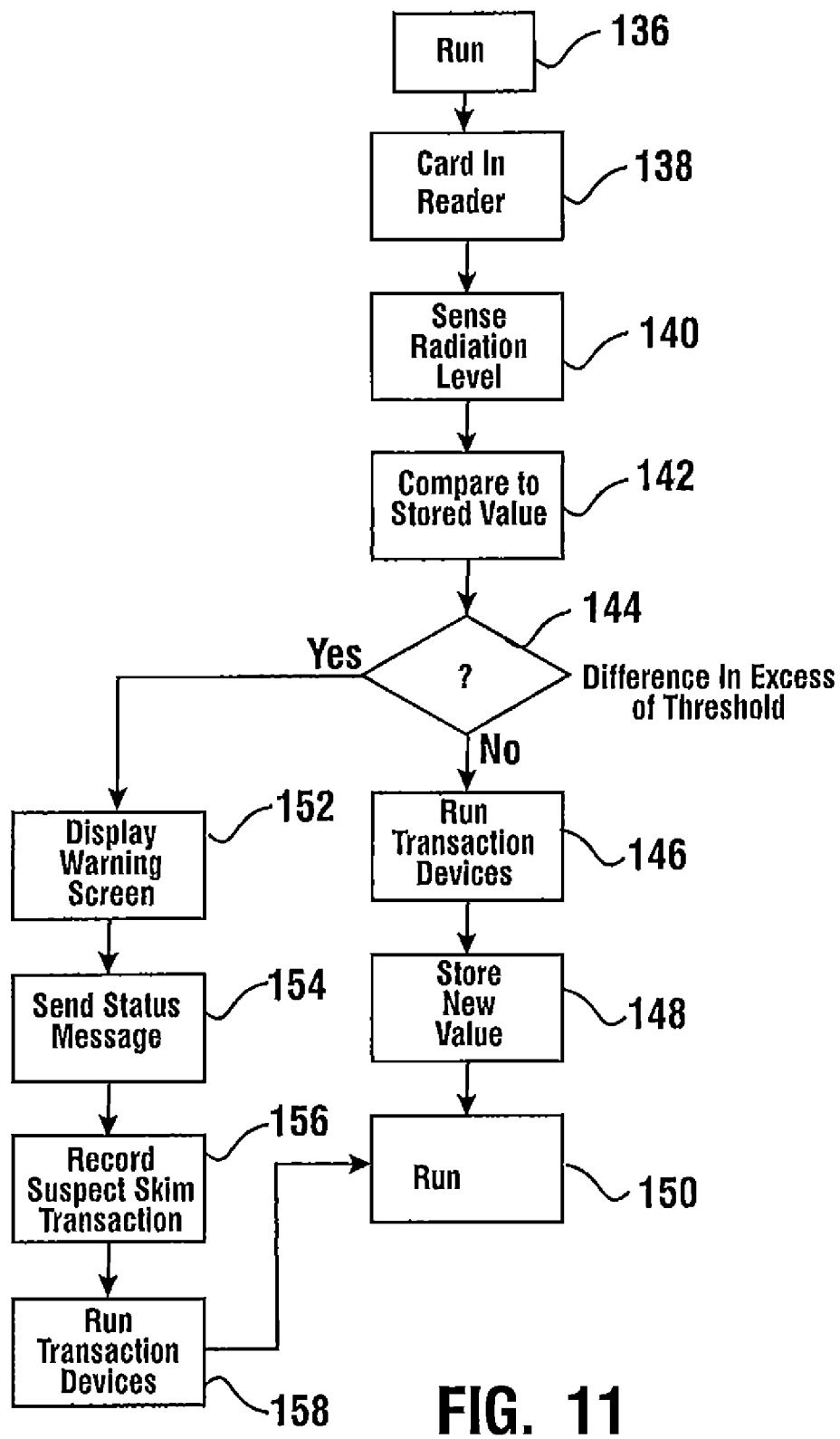
FIG. 11 is a schematic view of exemplary logic for purposes of detecting the presence of an unauthorized card reading device in proximity to the card reader during operation of the ATM.

FIG. 11 demonstrates an exemplary simplified logic flow executed by a controller for detecting the installation of an unauthorized card reading device. It should be understood that this transaction logic is part of the overall operation of the machine to carry out transactions. In this exemplary logic flow the machine operates to carry out card reading transactions in a normal manner and to additionally execute the represented steps as a part of such logic each time a card is read. From an initial step 136 the controller in the machine is operative to sense that a card is in the reader within the machine in a step 138. Generally in these circumstances the controller will be operating the radiation emitting devices 126 as the user has inserted their card and the card has been drawn into the machine. In this exemplary embodiment the controller continues to operate the radiation emitting devices and senses the radiation level or levels sensed by one or more sensors 128. This is done in a step 140.

The controller is next operative to compare the signals corresponding to the sensed radiation levels to one or more values in a step 142. This comparison may be done a number of ways and may in some embodiments execute fuzzy logic so as to avoid giving false indications due to acceptable conditions such as a user having the user's finger adjacent to the card slot 28 during a portion of the transaction. In the case of a user's finger for example, the computer may determine whether an unauthorized reading device is installed based on the nature, magnitude and changes during a transaction in sensed radiation, along with appropriate programmed weighing factors. Of course various approaches may be used within the scope of the concept discussed herein. However, based on the one or more comparisons in step 142 the controller is operative to make a decision at step 144 as to whether the sensed value(s) compared to stored value(s) compared in step 142 have a difference that is in excess of one or more thresholds which suggest that an unauthorized card reading device has been installed.

If the comparison does not indicate a result that exceeds the threshold(s) the ATM transaction devices are run as normal as represented in a step 146. For example, a customer may be prompted to input a PIN, and if the card data and PIN are valid, the customer may be authorized to conduct a cash dispensing transaction through operation of the machine. Further in the exemplary embodiment, the controller may operate to adjust the stored values to some degree based on the more recent readings. This may be appropriate in order to compensate for the effects of dirt on the fascia or loss of intensity of the emitting devices or other factors. This is represented in a step 148. In step 148 the controller operates the ATM to conduct transaction steps in the usual manner as represented in a step 150.

If in step 144 the difference between the sensed and stored values exceeds the threshold(s), then this is indicative that an unauthorized card reading device may have been installed since the last transaction. In the exemplary embodiment when this occurs, the controller is operative to present a warning screen to the user as represented in a step 152. This warning screen may be operative to advise the user that an unauthorized object has been sensed adjacent to the card reader slot. This may warn a user for example that a problem is occurring. Alternatively if a user has inadvertently placed innocently some object adjacent to the card reader slot, then the user may withdraw it. In addition or in the alternative, further logic steps may be executed such as prompting a user to indicate whether or not they can see the radiation emitting devices being illuminated adjacent to the card slot and prompting the user to provide an input to indicate if such items are visible. Additionally or in the alternative, the illuminating devices within the housing 66 may be operative to cause the emitting devices to output words or other symbols which a user can indicate that they can see or cannot see based on inputs provided as prompts from output devices of the machine. This may enable the machine to determine whether an unauthorized reading device has been installed or whether the sensed condition is due to other factors. It may also cause a user to note the existence of the reading device and remove it. Of course various approaches could be taken depending on the programming of the machine.

If an unauthorized reading device has been detected, the controller in the exemplary embodiment will also execute a step 154 in which a status message is sent to an appropriate service provider or other entity to indicate the suspected problem. This may be done for example through use of a system like that shown in U.S. Pat. No. 5,984,178 the disclosure of which is incorporated herein by reference. Alternatively messages may be sent to system addresses in a manner like that shown in U.S. Pat. No. 6,289,320 the disclosure of which is also incorporated herein by reference. In a step 156 the controller will also operate to record data identifying for the particular transaction in which there has been suspected interception of the card holder's card data. In addition or in the alternative, a message may be sent to the bank or other institution alerting them to watch for activity in the user's card account for purposes of detecting whether unauthorized use is occurring. Alternatively or in addition, some embodiments may include card readers that change, add or write data to a user's card in cases of suspected interception. Such changed data may be tracked or otherwise used to assure that only a card with the modified data is useable thereafter. Alternatively or in addition, in some embodiments the modified card may be moved in translated relation, moved irregularly or otherwise handled to reduce the risk that modified data is intercepted as the card is output from the machine. Of course these approaches are exemplary of many that may be employed.

In the exemplary embodiment the ATM is operated to conduct a transaction even in cases where it is suspected that an unauthorized card reading device has been installed. This is represented in a step 158. However, in other embodiments other approaches may be taken such as refusing to conduct the transaction. Other steps may also be taken such as capturing the user's card and advising the user that a new one will be issued. This approach may be used to minimize the risk that unauthorized transactions will be conducted with the card data as the card can be promptly invalidated. Of course other approaches may be taken depending on the programming of the machine and the desires of the system operator. In addition while the fraud device shown is an unauthorized card reading device, the principles described may also be used to detect other types of fraud devices such as for example false fascias, user interface covers and other devices.

In some embodiments additional or alternative features and methods may be employed to help detect the presence of unauthorized card reading devices or other attempted fraud devices in connection with the ATM. For example in some embodiments an oscillation sensor may be attached to the machine to detect changes in frequency or vibration that result from the installation of unauthorized devices on the ATM. FIG. 10 shows schematically an oscillator 127 attached to the interior surface of the ATM fascia. Oscillator 127 may be operative responsive to the controller and suitable vibration circuitry to impart vibratory motion to the fascia in the vicinity of the card reader slot. A sensor 129 is in operative connection with the fascia and is operative to sense at least one parameter of the motion imparted to the fascia by the oscillator 127. Although oscillator 127 and sensor 129 are shown as separate components, it should be understood that in some embodiments the functions of the components may be performed by a single device.

The sensor 129 is in operative connection with the controller of the ATM through appropriate circuitry. The controller selectively activates the oscillator and the sensor 129 is operative to sense the resulting movement of the fascia caused by the oscillation. The installation of an unauthorized card reading device or other fraud device on the ATM will generally result in a change in at least one property being sensed by the sensor 129. This may include changes in amplitude, frequency or both. Alternatively or in addition, some embodiments may provide for the oscillator to impart vibration characteristics of various types or vibratory motion through a range of frequencies and/or amplitudes. Sensed values for various oscillatory driving outputs may then be compared through operation of the controller to one or more previously stored values. Variances from prior values may be detected or analyzed through operation of the controller and notifications given in situations where a change has occurred which suggests the installation of an unauthorized device.

In some embodiments the controller may cause the oscillator and sensor to operate periodically to sense for installation of a possible unauthorized device. Alternatively, the controller may cause such a check to be made during each transaction. Alternatively in some embodiments oscillation testing may be conducted when a possible unauthorized device is detected by sensing radiation properties. The controller may operate to take various actions in response to sensing a possible unauthorized reading device through vibration, radiation or both. For example detecting a possible fraud device by both radiation and oscillation may warrant taking different actions than only detecting a possible fraud device through only one test or condition.

In some embodiments the controller may be programmed to adjust the thresholds or other limits used for resolving the presence of a possible fraud device for responses to changes that occur over time at the machine. This may include for example adjusting the thresholds for indicating possible fraud conditions based on the aging of the oscillator or the sensor. Such adjustments may also be based on parameters sensed by other sensors which effect vibration properties. These may include for example, the fascia temperature, air temperature, relative humidity and other properties. Of course readings from these and other sensors may be used to adjust thresholds of the oscillation sensor, radiation sensor or other fraud device sensors. Various approaches may be taken depending on the particular system.

In some embodiments the oscillator may additionally or alternatively be used to prevent the unauthorized reading of card reader signals. This may be done for example when the banking machine has a device which takes a user card into the machine for purposes of reading data on the card. In such embodiments the controller may operate to vibrate the area of the fascia adjacent to the card reader slot when a user's card is moving into and/or out of the slot. In such cases the vibration may be operative to cause the generation of noise or inaccurate reading by an unauthorized card reading sensor so as to make it more difficult to intercept the card stripe data using an unauthorized reading device. In some embodiments such vibration may also serve to disclose or make more apparent the presence of unauthorized card reading devices. Of course these approaches are exemplary and in other embodiments other approaches may be used.

In some exemplary embodiments provision may be made for detecting the presence of unauthorized input sensing devices for sensing a user's inputs through the keypad on the ATM. Such unauthorized input sensing devices may be used by criminals to sense the PIN input by the user. Detecting unauthorized devices may be accomplished by providing appropriate sensing devices in or adjacent to the keypad. Such sensing devices may be operative to detect that a structure has been placed over or adjacent to the keypad. Such sensors may be in operative connection with the controller in the machine or other devices which are operative to determine the probable installation of such an unauthorized input sensing device. In response to determining the probable installation of such a device, the controller may be operative in accordance with its programming to provide notification to appropriate entities, modify the operation of the machine such as to disable operation or prevent certain operations, or to take other appropriate actions.

Figure 12:
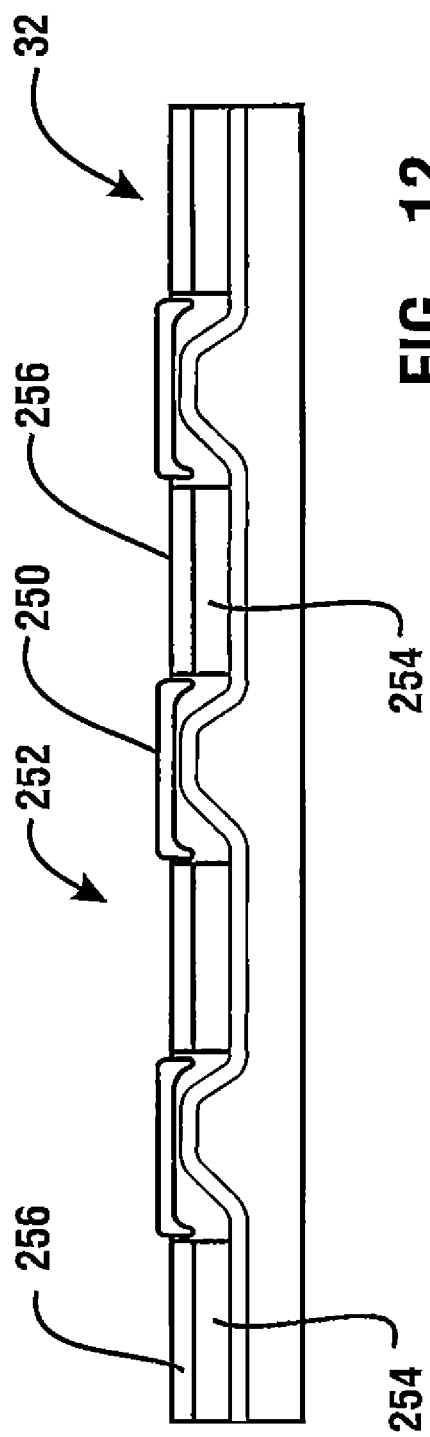
FIG. 12 is an exemplary side, cross sectional view of an ATM keypad.

FIG. 12 shows the cross-sectional view of exemplary keypad 32. Keypad 32 is shown schematically, and it should be understood that not all of the components of the keypad are represented. Keypad 32 includes a plurality of keys 250. Keys 250 are moveable responsive to pressure applied by a user's finger to provide an input corresponding to alphabetical or numerical characters. Extending between some of the keys 250 are areas or spaces 252. Extending in spaces 252 are sensors 254. In the exemplary embodiment the sensors 254 are radiation type sensors, but as previously discussed, in other embodiments other approaches may be used. Overlying the sensors 254 is an outer layer 256. In the exemplary embodiment, layer 256 is translucent or otherwise comprised of material so as to partially enable the transmission of radiation from the sensors therethrough.

Figure 13:
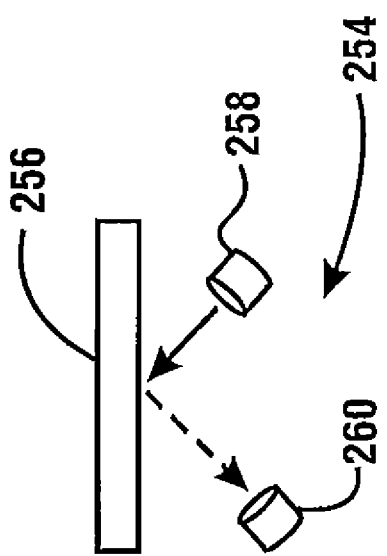
FIG. 13 is a schematic representation of a sensor for sensing whether an unauthorized key input sensing device has been placed adjacent to the keypad.

As represented in FIG. 13, the exemplary sensors 254 include a radiation emitter 258 and a radiation receiver 260. During operation the radiation emitter is operative to output radiation that is at least partially reflected from the inner surface of layer 256. The reflected radiation is received by the receiver 260. Corresponding electrical signals are produced by the receiver, and such signals are transmitted through appropriate circuitry so as to enable the controller to detect the changes in signals that correspond to probable presence of an unauthorized reading device.

Figure 14:
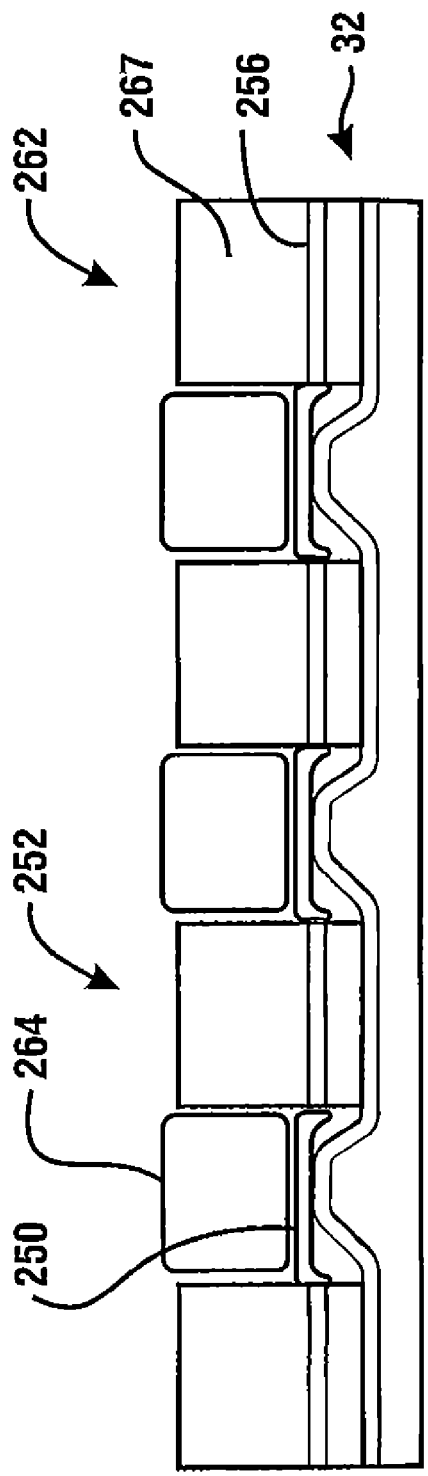
FIG. 14 is a view of a keypad similar to FIG. 12 but with an unauthorized key input sensing device attached.

FIG. 14 is a schematic view of an unauthorized input intercepting device 262 that has been positioned in overlying relation of a keypad 32. The input intercepting device 262 includes false keys 264 which are moveable and which are operatively connected to the corresponding keys 250 of the keypad. In the exemplary embodiment, input intercepting device 262 includes sensors which are operative to detect which of the false keys 264 have been depressed by a user. Because the depression of the false keys is operative to actuate the actual keys 250, the ATM is enabled to operate with the device 262 in place. Input intercepting device 262 in exemplary embodiments may include a wireless transmitter or other suitable device for transmitting the input signals to a criminal who may intercept such inputs.

Figure 15:
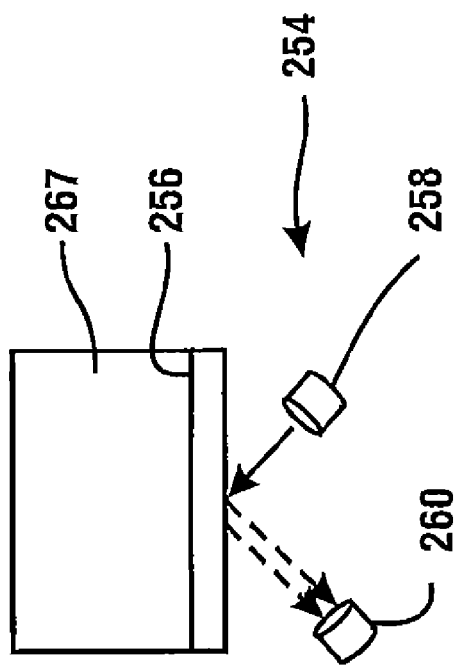
FIG. 15 is a schematic representation similar to FIG. 13, but representing the change in reflected radiation resulting from the attachment of the unauthorized key input sensing device.
Figure 19:
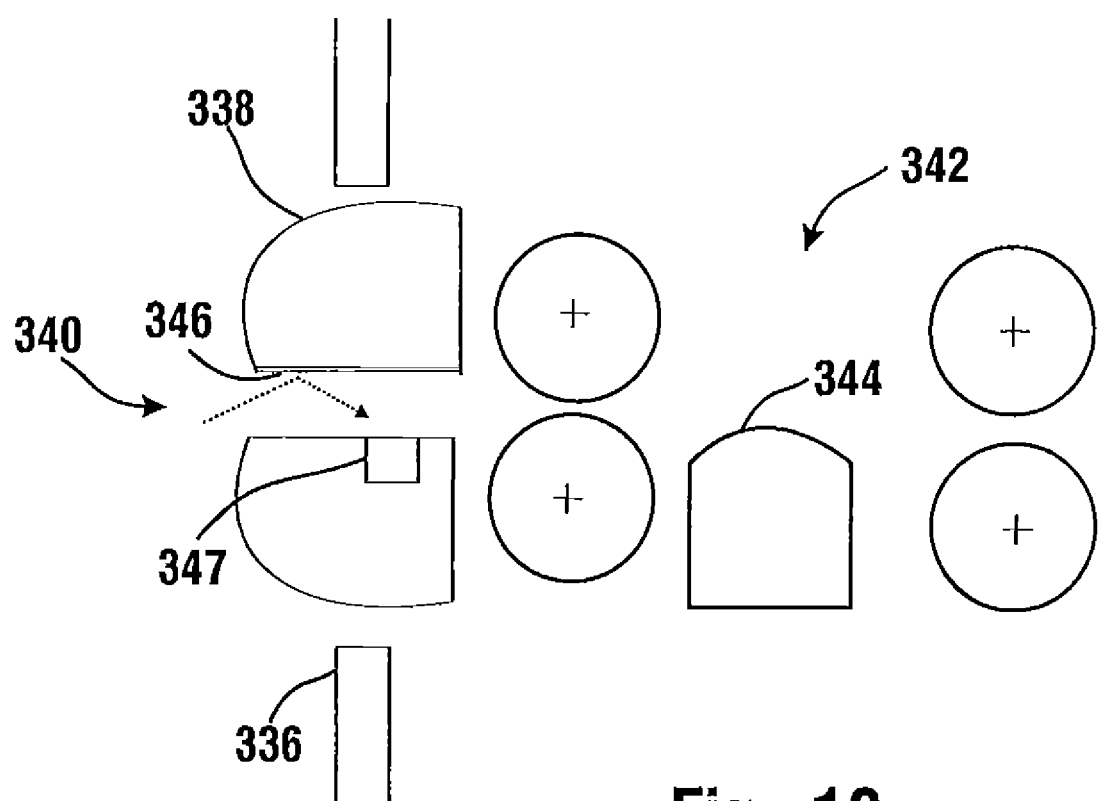
FIG. 19 is a schematic view of yet a further alternative embodiment of an anti-fraud device.

As represented in FIG. 19, the input intercepting device 262 includes portions 267 which extend in the areas 252 in overlying relation of layer 256. As represented in FIG. 15, the portion of the input intercepting device extending in overlying relation of the layer 256 is operative to cause a change in the amount of radiation from the emitter 258 that is reflected and sensed by the receiver 260 of the sensor. This is because the overlying portion will have different radiation reflecting or absorbing characteristics which will change the radiation reflective properties of the layer 256 compared to when no such input intercepting device is present. Thus the installation of the unauthorized input intercepting device can be detected.

In some exemplary embodiments the controller may be operative to sense the level of reflected radiation at the sensors periodically. This may be done, for example, between transactions when a user is not operating the terminal. This may avoid giving a false indication that an unauthorized input intercepting device has been installed when a user is resting a hand or some other item adjacent to the keypad during a transaction. Of course in other embodiments sensor readings can be taken and compared during transactions to prior values stored in a data store to determine if a change lasting longer than normal has occurred which suggests that an unauthorized input intercepting device has been installed rather than a user has temporarily placed their hand or some other item adjacent to the keypad. For example, in some exemplary embodiments the controller may not resolve that there is a probable unauthorized input intercepting device on the machine until a significant change from a prior condition is detected in the radiation properties adjacent to the keypad on several occasions both during a transaction and thereafter. Alternatively or in addition, a controller may be operative to determine that an improper device has been installed as a result of changes that occur during a time when no transactions have occurred. Alternatively in other embodiments, the controller may operate to sense and analyze signals from the sensors responsive to detecting inputs from other sensors, such as for example an ultrasonic sensor which senses that a person has moved adjacent to the machine but has not operated the machine to conduct a transaction. Of course these approaches are merely exemplary of many approaches that may be used.

It should be understood that although in the exemplary embodiment radiation type sensors are used for purposes of detection, in other embodiments other types of sensors may be used. These include, for example, inductance sensors, sonic sensors, RF sensors, or other types of sensing approaches that can be used to detect the presence of material in locations that suggest an unauthorized input intercepting device being positioned adjacent to the keypad. Further, in some embodiments the controller or other circuitry associated with the sensors may be operative to make adjustments for normal changes that may occur at the machine. These may include, for example, changes with time due to aging of emitters, the build up of dirt in the area adjacent to the keypad, weather conditions, moisture conditions, scratching of the surface of the sensing layer, or other conditions which may normally occur. Appropriate programs may be executed by the controller or other circuitry so as to recalibrate and/or compensate for such conditions as may occur over time while still enabling the detection of a rapid change which is sufficiently significant and of such duration so as to indicate the probable installation of an unauthorized input intercepting device. Of course these approaches are exemplary of many approaches that may be used.

In other embodiments other or additional approaches to detecting fraudulent reading or other improper activities may be used. For example, in some embodiments the fascia of the banking machine may be subject to observation within a field of view of one or more imaging devices such as camera 131 schematically represented in FIG. 10. Camera 15 may be in operative connection with an image capture system of the type shown in U.S. Pat. No. 6,583,813, the disclosure of which is incorporated herein by reference.

In some embodiments the controller and/or an image capture system may be operative to execute sequences of activities responsive to triggering events that may be associated with attempts to install or operate fraud devices. For example, the presence of a person in front of the banking machine may be sensed through image analysis, weight sensors, sonic detectors or other detectors. The person remaining in proximity to the machine for a selected period or remaining too long after a transaction may constitute a triggering event which is operative to cause the system to take actions in a programmed sequence. Such actions may include capturing images from one or more additional cameras and/or moving image data from one or more cameras from temporary to more permanent storage. The sequence may also include capturing image data from the fascia to try to detect tampering or improper devices. Radiation or vibration tests may also be conducted as part of a sequence. Notifications and/or images may also be sent to certain entities or system addresses. Of course these actions are exemplary.

In some exemplary embodiments the controller of the ATM or other connected computers may be operatively programmed to analyze conditions that are sensed and to determine based on the sensed conditions that a fraud device is installed. Such a programmed computer may be operative to apply certain rules such as to correlate the repeated sensing of abnormal conditions with a possible fraud or tampering condition and to conduct tests for the presence of fraud devices. Such events may constitute soft triggers for sequences or other actions to detect and reduce the risk of fraud devices. Of course these approaches are merely exemplary and in other embodiments other approaches may be used.

In some embodiments the ATM may include sensors adapted to intercept signals from unauthorized card readers or customer input intercepting devices. For example, some fraud devices may operate to transmit RF signals to a nearby receiver operated by a criminal. The presence of such RF signals in proximity to the ATM may be indicative of the installation of such a device. Such signals may be detected by appropriate circuitry and analyzed through operation of the ATM controller or other processor, and if it is determined that it is probable that such a device is installed, programmed actions may be taken.

For example, in some embodiments suitable RF shielding material may be applied to or in the fascia to reduce the level of RF interference from devices within the ATM at the exterior of the fascia. Antennas or other appropriate radiation sensing devices may be positioned adjacent to or installed on the fascia. A change in RF radiation in the vicinity of the fascia exterior may result upon the installation of an unauthorized device. The RF signals can be detected by receiver circuitry, and signals or data corresponding thereto input to a processor. In some embodiments the circuitry may also determine the frequency of the radiation sensed to be used in resolving if it is within the range emitted by legitimate devices such as cell phones of users operating the ATM. In other embodiments the circuitry may analyze the signals to determine if they are varying, and the circuitry and/or the processor may evaluate whether the changes in signal correspond to the input of a PIN or a card to the ATM.

In response to the sensed signal data, the processor may operate in accordance with its programming to evaluate the nature and character of the intercepted signals. For example, if the signals do not correspond to a legitimate source, such as a cell phone, the processor may operate to take actions such as to wholly or partially cease operation of the ATM, capture images with a camera, and/or notify an appropriate remote entity through operation of the ATM. Alternatively, the processor may compare the sensed RF signals to transaction activity at the ATM. If the sensed signals are determined to be varying in ways that correspond in a pattern or relationship to card or PIN inputs, for example, the processor may operate in accordance with its programming to cause the ATM or other devices to take appropriate programmed steps.

In still other exemplary embodiments the processor may be in operative connection with an RF emitter. The processor may operate in accordance with its programming to cause the emitter to generate RF signals that interfere with the detected signals. This can be done on a continuing basis or alternatively only at times during user operation of the ATM when user inputs are likely to be intercepted. For example, the processor controlling the emitter may operate the ATM or be in communication with a controller thereof. In such situations, the processor may operate to control the emitter to produce outputs at times when a user's card is moving into or out of a card slot, and/or when the ATM is accepting a user's PIN or other inputs. Thus, the emitter may be operative to produce interfering signals during relatively brief periods so as to not disrupt RF transmissions for an extended period in the event an incorrect determination is made and the RF signals are from a legitimate source.

In some embodiments an emitter may be a type that transmits on a plurality of frequencies intended to disrupt transmissions within the expected range of frequencies for a fraud device. In other embodiments the emitter may be controlled responsive to the processor to match the frequency or frequencies of suspect signals that have been detected. Of course these approaches are exemplary of approaches that may be used.

Figure 16:
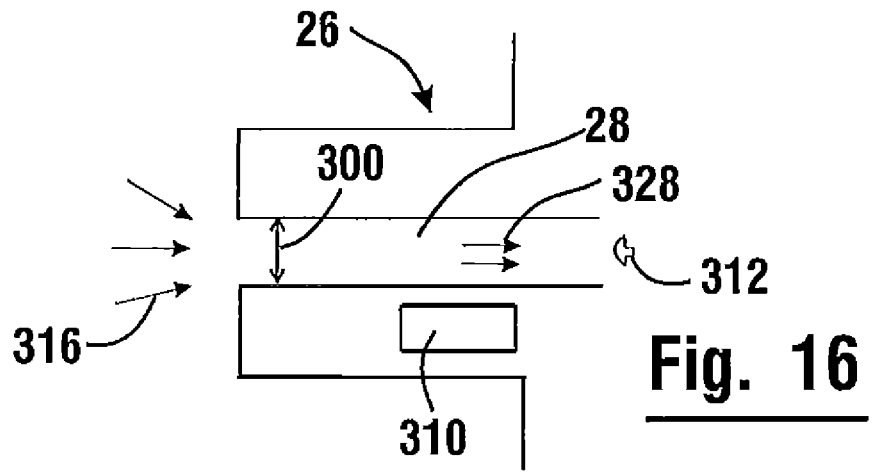
FIG. 16 is a schematic view of an anti-fraud device disposed within a slot of a card reader.
Figure 17:
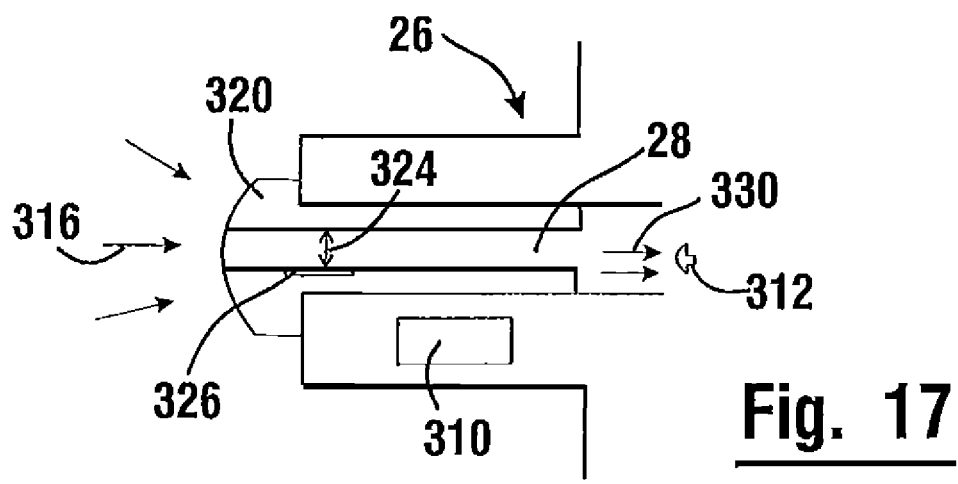
FIG. 17 is a schematic view of an unauthorized card reading device mounted adjacent the card reader.

An alternate exemplary embodiment is described with particular reference to FIGS. 16 and 17. In the exemplary embodiment, card reader 26, also shown schematically in FIG. 3, includes a card reader slot 28 defining a predetermined opening as indicated by arrow 300. The card reader includes component 310, such as a magnetic read head, operative to read data included on the magnetic stripe of a card such as a debit or credit card. The embodiment shown in FIG. 16 is merely exemplary, and it should be understood that the principles described herein are applicable to card readers that accept a card into the machine and to card readers that do not accept a card into the machine.

At least one sensing device also referred to as a sensor, schematically indicated 312, is positioned within an interior of the ATM adjacent the card slot 28. In one exemplary embodiment, the sensing device 312 is able to sense at least one property of radiation passing through the card reader slot 28 to the interior of the ATM and reaching the sensing device. For example, the sensing device 312 may be positioned so as to sense the intensity of ambient light that enters the slot from outside the ATM housing, as indicated by arrows 316. Of course it should be understood that the positioning of the sensing device is schematic only and in some embodiments the sensing device may comprise multiple sensing devices and may be located outside the card path. Alternatively, one or more radiation sensors may be mounted on a moving member that moves into the card path when a card is not present.

As represented in FIG. 17, in the event that an unauthorized card reading device 320 is positioned adjacent the card reader 26, the property sensed by the sensing device 312 will be altered. For example, a sensing device enabled to sense the intensity of ambient light entering the slot will detect a change in that property.

The unauthorized card reading device 320 may be positioned such that at least a portion of the unauthorized device extends in the slot 28 which effectively narrows the opening defined by the card reader slot 28, as illustrated by arrow 324. In the illustrated embodiment, the unauthorized card reading device 320 includes a fraudulent magnetic read head 326 used to skim data from a passing card stripe. The unauthorized card reading device 320 defines a narrower opening than the legitimate card slot 28 to cause the inserted card to be kept close to the fraudulent magnetic read head 326.

The narrowed opening reduces the amount of ambient light entering the slot 28, and ultimately the amount of light that passes through the slot and is detected by sensing device 312. The decrease in intensity of ambient light detectable by the sensing device is illustrated in FIGS. 16 and 17 by arrows 328, 330, respectively. In an exemplary embodiment, the sensing device 312 includes at least one photocell which is used to sense light as an integrator over area. The exemplary sensor configuration is generally not sensitive to dust due to its position within the machine interior. Of course, in other embodiments other approaches may be used.

In other embodiments an unauthorized card reading device may not necessarily have a narrower slot than the ATM's card reader slot. However the placement of the unauthorized card reading device will often result in a greater distance between the card opening to the unauthorized device outside the machine, and the at least one sensor inside the banking machine housing. This increased distance of the overall card slot, and longer light path results in the amount of light reaching the at least one sensor being reduced. Such a reduction in ambient light or other radiation can be monitored and sensed between transactions or at other times to detect when such a device is installed, for example. Of course, these approaches are exemplary.

Figure 18:
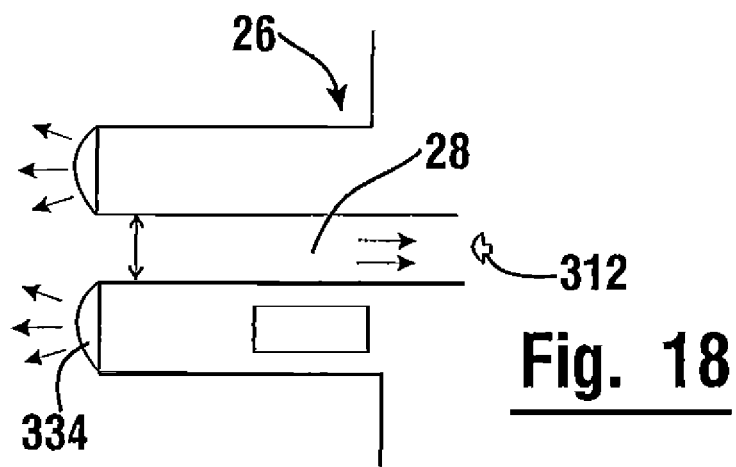
FIG. 18 is a schematic view of an alternate embodiment utilizing radiation emitters to emit radiation detectable by an anti-fraud device.

In an alternate embodiment, illustrated in FIG. 18, the property sensed by the sensing device 312 may be intensity of radiation emitted by one or more radiation emitters 334, such as LEDs, which are positioned to enable radiation emitted thereby to enter the slot 28 and be detected by sensing device 312. As will be readily appreciated, placement of an unauthorized card reading device adjacent the card reader impacts the detectable radiation.

The one or more radiation emitters 334 may operate substantially continuously, intermittently, or in accordance with transaction instructions as previously described. For example, the radiation emitters 334 may emit radiation responsive to operation of at least one controller in the machine when a user is instructed by the machine to insert a card into the card reader. The radiation is sensed by the sensing device. If an unauthorized card reading device has been positioned adjacent the card reader slot subsequent to a prior transaction, there is a detectable change in the property sensed by the sensing device. Further, in some embodiments a radiation guide, such as a fiber optic strand may extend from an area adjacent at least one emitter to an area adjacent the detector. Having the outside end of the strand located in the area where an unauthorized device would be attached may result in a greater change in sensed radiation to indicate the installation of an unauthorized card reading device. Of course this approach is exemplary.

In an exemplary embodiment, the sensing device 312 is in operative connection with at least one controller in the machine, as in previously described embodiments. With reference again to FIG. 11, the controller is operative responsive to its programming to compare one or more values corresponding to the sensed property to one or more stored values and make a determination as to the probability that an unauthorized card reading device 320 has been installed on the machine. Numerous factors and conditions may be used in making the determination. If an unauthorized card reading device is likely present, the controller generates at least one signal or otherwise enables the machine to take at least one action responsive to a change in the sensed property, as previously described. In an exemplary embodiment, the responsive action may include the activation of an oscillator 127, as shown in FIG. 10 and previously described. Alternatively, the controller may sense for an unauthorized source of Radio Frequency (RF) signals at the machine. Of course this is merely exemplary.

In still other embodiments the automated banking machine may include at least one light operated externally, such as a fascia light. The fascia light may provide a light level that is used to calculate a threshold of minimum light that can be expected to pass through the card slot when no card is present in the slot. The threshold can be used by the at least one controller to determine if the amount of radiation reaching the sensor is below the threshold. In such circumstances the at least one controller may be operative in accordance with its programming to generate at least the signal which can be used to indicate the likely presence of an unauthorized card reading device.

Of course in some embodiments the programming of the at least one controller is operative to compare the amount of light received at different times, such as between card reading transaction steps, to detect a change that corresponds to installation of an unauthorized card reading device. Alternately or in addition, the at least one controller may operate to monitor signals from the at least one sensor at times between transactions for changes which correspond to the installation of an unauthorized card reading device. In still other embodiments the at least one controller may be programmed to not identify certain changes as corresponding to the installation of an unauthorized reading device. This may include, for example, changes in radiation for card insertion, changes due to fingers placed against the slot by a user, such as a blind user, and other conditions that may cause a temporary drop in radiation sensed. In some embodiments the programming of the controller may disregard certain conditions based on the then-current operational status of the machine, such as receiving or delivering a card, for example. In some embodiments the at least one controller may execute fuzzy logic to determine events that correspond to installation of an unauthorized card reading device. Of course these approaches are merely exemplary.

In still other embodiments the card slot may be bounded by one or more light reflecting surfaces. Such light reflecting surfaces may be configured to facilitate detecting the installation of an unauthorized card reading device. For example, in some embodiments, multiple opposed side surfaces bounding a card slot may be comprised of reflective material. Such material may be operative to normally conduct more radiation through the slot from outside the machine to the at least one sensor within the machine housing. Therefore, in some embodiments this configuration may cause a greater reduction in radiation reaching the at least one sensor when an unauthorized card reading device is installed.

In still other embodiments the reflective surfaces may be tapered or otherwise contoured to facilitate detection of changes in radiation that result from an unauthorized card reading device. For example, in some embodiments one or more reflective surfaces may be contoured to increase the amount of light that passes through the card slot to the at least one sensor. However, in some embodiments one or more reflective surfaces may be contoured to reflect at least some light falling on the card slot so it does not reach the sensor. This may be useful in embodiments where the card slot is subject to exposure to a wide range of radiation levels, and restricting the radiation that reaches the at least one sensor facilitates identifying a change that indicates the installation of an unauthorized card reading device. In still other embodiments, reflective surfaces may facilitate directing radiation to at least one sensor within the machine. This may include using a contoured mirror surface that focuses visible radiation for example.

Further, in some embodiments a mirror surface may be used on only one side of the slot. This may be done, for example, to provide reflection of radiation on a side of a slot opposite the slot side adjacent magnetic stripes of cards. Thus an unauthorized card reading device is likely to be positioned at least on the slot side opposite of the reflective surface, which may reduce radiation reading the reflective surface. This may help in detecting certain types of unauthorized card reading devices. An example is shown in FIG. 19 which includes an ATM fascia surface 336 through which a card reader housing 338 extends. The card reader housing includes a card slot 340 through which cards pass. The card reader includes within the ATM, a card reader mechanism 342, which includes a read head 344. The mechanism operates responsive to at least one controller to selectively move magnetic stripe cards by engagement with the rollers shown, so that data in the stripe is read by the read head.

In this exemplary embodiment, at least one reflective surface 346 is positioned on a side of the slot opposed of the side of the slot which is adjacent the stripe on cards which pass through the slot. At least one sensor 347 is positioned on the side of the slot opposite the reflective surface. As can be appreciated, an unauthorized reading device will generally be positioned ahead of the opening to the card slot and will extend at least on the side of the slot on which magnetic stripes of cards are positioned. As can be appreciated from the arrow shown in phantom, an unauthorized card reading device in this position will generally reduce the amount of light reflected from surface 346 to the sensing device. As a result signals from the sensing device can be used by at least one controller to determine when an unauthorized card reading device has been installed. Of course these approaches are merely exemplary of approaches that may be used.

In the exemplary embodiment the ATM 10 is provided with enhanced diagnostic capabilities as well as the ability for servicers to more readily perform remedial and preventive maintenance on the machine. This is accomplished in an exemplary embodiment by programming the controller and/or alternatively distributed controllers and processors associated with the transaction function devices, to sense and capture diagnostic data concerning the operation of the various transaction function devices. In an exemplary embodiment this diagnostic data may include more than an indication of a disabling malfunction. In some embodiments and with regard to some transaction function devices, the data may include for example instances of speed, intensity, deflection, vacuum, force, friction, pressure, sound, vibration, wear or other parameters that may be of significance for purposes of detecting conditions that may be developing with regard to the machine and the transaction function devices contained therein. The nature of the diagnostic data that may be obtained will depend on the particular transaction function devices and the capabilities thereof as well as the programming of the controllers within the machine.

Thus, the features and characteristics of the embodiments previously described achieve desirable results, eliminate difficulties encountered in the use of prior devices and systems, solve problems and may attain one or more of the objectives stated above.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:
1. A method comprising:
(a) installing at least one sensor adjacent to a card entry slot of an automated banking machine,
   wherein the machine includes a plurality of transaction function devices,
      wherein the plurality of transaction function devices include at least one data reader, a display, and a cash dispenser,
         wherein the at least one data reader includes a card reader that is operable to read card data usable to identify a financial account on which financial transactions can be carried out with the machine,
   wherein the at least one sensor is operable to sense at least one electromagnetic field property of material located adjacent to the card entry slot;
(b) installing at least one signal emitter adjacent to the card entry slot,
   wherein the at least one signal emitter is operable to output interference signals configured to interfere with card data reading by an unauthorized card reader located adjacent to the card entry slot; and
(c) equipping the machine to include a controller that is in operative connection with the at least one sensor and the at least one signal emitter,
   wherein the controller is operable to determine whether the at least one sensor senses a change in the at least one electromagnetic field property,
      wherein the controller is operable to determine whether a sensed change in the at least one electromagnetic field property exists for a predetermined duration, wherein the controller is operable responsive at least in part to a determination that the sensed change existed for the predetermined duration, to
cause the at least one signal emitter to output the interference signals,
cause at least one of the plurality of transaction function devices to cease operation, and
allow the machine to provide at least one indication that an unauthorized card reader was sensed by the at least one sensor.

2. The method according to claim 1 wherein the machine is part of a banking system that includes a plurality of automated banking machines, wherein the controller includes at least one processor, wherein the at least one data reader includes a biometric reader, and further comprising:
(d) operating the card reader to read card data;
(e) operating the biometric reader to read biometric data;
(f) authorizing a user to use the machine to carry out a cash dispensing transaction involving the cash dispenser, responsive at least in part to each of:
computer-determined correspondence between the card data read in (d) and stored card information,
computer-determined correspondence between the biometric data read in (e) and stored biometric information, and
computer-determined correspondence between the card data read in (d) and the biometric data read in (e).

3. The method according to claim 1 wherein the at least one electromagnetic field property includes inductance, wherein (a) includes installing at least one inductance sensor,
wherein in (c) the controller is operable to determine whether the at least one inductance sensor senses a material inductance level change which is indicative of additional material located adjacent to the card entry slot.

4. The method according to claim 1 wherein the electromagnetic field property includes capacitance, wherein (a) includes installing at least one capacitance sensor,
wherein in (c) the controller is operable to determine whether the at least one capacitance sensor senses a material capacitance level change which is indicative of additional material located adjacent to the card entry slot.

5. Apparatus comprising:
at least one sensor operationally positionable to sense at least one electromagnetic field property of material located adjacent to a card entry slot of an automated banking machine which includes a plurality of transaction function devices comprising a display, a cash dispenser, and at least one data reader that comprises a card reader which is operable to read card data usable to identify a financial account on which financial transactions can be carried out with the machine,
at least one signal emitter operationally positionable adjacent to the card entry slot, to output interference signals configured to interfere with card data reading by an unauthorized card reader located adjacent to the card entry slot,
a controller operationally positionable in the machine in operative connection with the at least one sensor and the at least one signal emitter, to:
(i) determine whether the at least one sensor senses a change in the at least one electromagnetic field property,
(ii) responsive at least in part to a positive determination in (i), then determine whether the change exists for a predetermined duration, and
(iii) responsive at least in part to a positive determination in (ii), then
cause the at least one signal emitter to output the interference signals,
cause at least one of the plurality of transaction function devices to cease operation, and
allow the machine to provide at least one indication that an unauthorized card reader was sensed by the at least one sensor.

6. The apparatus according to claim 5 wherein the at least one electromagnetic field property includes inductance, wherein the at least one sensor comprises at least one inductance sensor,
wherein the controller is operationally positionable to determine whether the at least one inductance sensor senses a material inductance level change which is indicative of additional material located adjacent to the card entry slot.

7. The apparatus according to claim 5 wherein the at least one electromagnetic field property includes capacitance, wherein the at least one sensor comprises at least one capacitance sensor,
wherein the controller is operationally positionable to determine whether the at least one capacitance sensor senses a material capacitance level change which is indicative of additional material located adjacent to the card entry slot.

8. A method comprising:
(a) installing at least one sensor adjacent to a card entry slot of an automated banking machine,
wherein the machine includes a card reader that is operable to read card data usable to identify a financial account,
wherein the at least one sensor is operable to sense at least one property of material located adjacent to the card entry slot;
(b) installing at least one signal emitter adjacent to the card entry slot,
wherein the at least one signal emitter is operable to output interference signals configured to interfere with card data reading by an unauthorized card reader; and
(c) equipping the machine to include a controller that is in operative connection with the at least one sensor and the at least one signal emitter,
wherein the controller is operable to determine whether the at least one sensor sensed a change in the at least one property of material,
wherein the controller is operable responsive at least in part to a determination that the at least one sensor sensed a change in the at least one property of material, to both:
cause the at least one signal emitter to output the interference signals, and
allow at least one indication that an unauthorized card reader was sensed by the at least one sensor, to be provided.

9. The method according to claim 8 wherein the machine is part of a banking system that includes a plurality of automated banking machines, wherein the machine a cash dispenser and at least one data reader, wherein the at least one data reader includes both a biometric reader and the card reader, wherein the controller includes at least one processor, and further comprising:
(d) operating the card reader to read card data;
(e) operating the biometric reader to read biometric data;

(f) authorizing a user to use the machine to carry out a cash dispensing transaction involving the cash dispenser, responsive at least in part to each of:
computer-determined correspondence between the card data read in (d) and stored card information,
computer-determined correspondence between the biometric data read in (e) and stored biometric information, and
computer-determined correspondence between the card data read in (d) and the biometric data read in (e).

10. The method according to claim 8 wherein in (a) the at least one sensor is operable to sense at least one electromagnetic field property of the material located adjacent to the card entry slot.

11. The method according to claim 10 wherein the at least one electromagnetic field property includes inductance, wherein (a) includes installing at least one inductance sensor,
wherein in (c) the controller is operable to determine whether the at least one inductance sensor senses a material inductance level change which is indicative of additional material located adjacent to the card entry slot.

12. The method according to claim 10 wherein the electromagnetic field property includes capacitance, wherein (a) includes installing at least one capacitance sensor,
wherein in (c) the controller is operable to determine whether the at least one capacitance sensor senses a material capacitance level change which is indicative of additional material located adjacent to the card entry slot.

13. The method according to claim 8 wherein in (c) the controller is operable to allow the at least one indication to be provided by causing at least one message suggestive that an unauthorized card reader is present adjacent to the card entry slot, to be sent to at least one remote computer that is located remotely from the machine.

14. The method according to claim 8 wherein the controller includes at least one processor,
wherein the machine includes a plurality of transaction function devices comprising a display, a cash dispenser, and at least one data reader,
wherein the at least one data reader includes the card reader,
wherein the card reader is operable to read card data usable to identify a financial account on which financial transactions can be carried out with the machine,
wherein the controller in (c) is operable to determine whether a sensed change in the at least one property of material exists for a predetermined duration,
wherein the controller in (c) is operable responsive at least in part to a determination that the sensed change existed for the predetermined duration, to
cause the at least one signal emitter to output the interference signals,
cause at least one of the plurality of transaction function devices to cease operation, and
allow the machine to provide at least one indication that an unauthorized card reader was sensed by the at least one sensor.

15. Apparatus comprising:
at least one sensor operationally positionable to sense at least one property of material located adjacent to a card entry slot of an automated banking machine which includes a card reader which is operable to read card data usable to identify a financial account,
at least one signal emitter operationally positionable adjacent to the card entry slot, to output interference signals configured to interfere with card data reading by an unauthorized card reader,
a controller operationally positionable in the machine in operative connection with the at least one sensor and the at least one signal emitter, to both:
determine whether the at least one sensor sensed a change in the at least one property of material, and
then, responsive at least in part to a determination that the at least one sensor sensed a change in the at least one property of material, both:
cause the at least one signal emitter to output the interference signals, and
allow at least one indication that an unauthorized card reader was sensed by the at least one sensor, to be provided.

16. The apparatus according to claim 15 wherein the at least one sensor is operationally positionable to sense at least one electromagnetic field property of the material located adjacent to the card entry slot.

17. The apparatus according to claim 16 wherein the at least one electromagnetic field property includes inductance, wherein the at least one sensor comprises at least one inductance sensor,
wherein the controller is operationally positionable in the machine to determine whether the at least one inductance sensor senses a material inductance level change which is indicative of additional material located adjacent to the card entry slot.

18. The apparatus according to claim 16 wherein the at least one electromagnetic field property includes capacitance, wherein the at least one sensor comprises at least one capacitance sensor,
wherein the controller is operationally positionable in the machine to determine whether the at least one capacitance sensor senses a material capacitance level change which is indicative of additional material located adjacent to the card entry slot.

19. The apparatus according to claim 15 wherein the controller is operationally positionable in the machine to allow the at least one indication to be provided by causing at least one message suggestive that an unauthorized card reader is present adjacent to the card entry slot, to be sent to at least one remote computer that is located remotely from the machine.

20. The apparatus according to claim 15 wherein the controller includes at least one processor,
wherein the controller is operationally positionable in a machine that includes a plurality of transaction function devices comprising a display, a cash dispenser, and at least one data reader,
wherein the at least one data reader includes the card reader,
wherein the card reader is operable to read card data usable to identify a financial account on which financial transactions can be carried out with the machine,
wherein the controller is operationally positionable in the machine to determine whether a sensed change in the at least one property of material exists for a predetermined duration,
wherein the controller is operationally positionable in the machine to:
(i) determine whether the at least one sensor senses a change in the at least one property of material, (ii) responsive at least in part to a positive determination in (i), then determine whether the change exists for a predetermined duration, and
(iii) responsive at least in part to a positive determination in (ii), then
cause the at least one signal emitter to output the interference signals,
cause at least one of the plurality of transaction function devices to cease operation, and
allow the machine to provide at least one indication that an unauthorized card reader was sensed by the at least one sensor.

\* \* \* \* \*